(12) United States Patent
Ito

(10) Patent No.: US 7,289,678 B2
(45) Date of Patent: Oct. 30, 2007

(54) IMAGE TRANSFORMATION METHOD AND APPARATUS, AND STORAGE MEDIUM

(75) Inventor: Wataru Ito, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 375 days.

(21) Appl. No.: 11/008,969

(22) Filed: Dec. 13, 2004

(65) Prior Publication Data

US 2005/0089236 A1 Apr. 28, 2005

Related U.S. Application Data

(62) Division of application No. 09/852,801, filed on May 11, 2001, now Pat. No. 6,868,187.

(30) Foreign Application Priority Data

May 12, 2000 (JP) ............................. 2000-139750

(51) Int. Cl.
*G06K 9/36* (2006.01)
(52) U.S. Cl. ...................... 382/240; 382/248; 382/232
(58) Field of Classification Search ................ 382/232, 382/240, 135, 248, 235, 106; 375/240.19, 375/240.18; 358/527, 403, 254, 276; 345/208, 345/94

See application file for complete search history.

(56) References Cited

U.S. PATENT DOCUMENTS 5,831,586 A 11/1998 Hirai et al. ................... 345/94

(Continued)

FOREIGN PATENT DOCUMENTS

JP 404242028 A 8/1992

(Continued)

OTHER PUBLICATIONS

Olivier Rioul and Martin Vetterli: "Wavelets and Signal Processing", Oct. 1991, pp. 14-38.

(Continued)

*Primary Examiner*—Anh Hong Do
(74) *Attorney, Agent, or Firm*—Birch, Stewart, Kolasch & Birch, LLP

(57) ABSTRACT

Image data is separated into two components having elements arranged in a checkered pattern. A dummy setting component is obtained of the signal value occurring at the hole position of the first component, which is dummy-set corresponding to the direction of signal change of the first component. The dummy setting component is subtracted from the second component to obtain a difference component, which is the high-frequency component. By performing weighted addition on the signal value occurring at the hole position of component 1 and the signal value of the difference component, an addition dummy setting is obtained, and is then added to component 2 to obtain the low-frequency component. By repeatedly subjecting the low frequency-component to this processing, the image data can be transformed into the high-frequency components and the low-frequency components of a plurality of frequency bands.

27 Claims, 22 Drawing Sheets

U.S. PATENT DOCUMENTS

| | | | |
|---|---|---|---|
| 5,901,249 A | 5/1999 | Ito | 382/239 |
| 6,236,684 B1 * | 5/2001 | Wu | 375/240.19 |
| 6,307,968 B1 | 10/2001 | Liguori | 382/235 |

FOREIGN PATENT DOCUMENTS

| | | |
|---|---|---|
| JP | 7-23229 | 1/1995 |
| JP | 7-79350 | 3/1995 |
| JP | 6-274614 | 9/1994 |
| JP | 6-350990 | 12/1994 |
| JP | 7-23228 | 1/1995 |

OTHER PUBLICATIONS

Stephane Mallat: "Zero-Crossings of a Wavelet Transform.", IEEE Transanctions on information theory, vol. 37, No. 4, Jul. 1991, pp. 1019-1033.

Katholieke Universiteit Leuven Department of Computer Science, Celestijnenlaan 200A—B-3001 "The Red-Black Wavelet Transform.", Report TW 271, Dec. 1997, pp. 1-16.

* cited by examiner

CONVENTIONAL ART

CONVENTIONAL ART

CONVENTIONAL ART

CONVENTIONAL ART

IMAGE TRANSFORMATION METHOD AND APPARATUS, AND STORAGE MEDIUM

CROSS-REFERENCE TO RELATED APPLICATION

This application is a Divisional of application Ser. No. 09/852,801, filed on May 11, 2001, now U.S. Pat. No. 6,868,187 the entire contents of which are hereby incorporated by reference and for which priority is claimed under 35 U.S.C. § 120.

BACKGROUND OF THE INVENTION

1. Field of the Invention

The present invention relates in general to an image transformation-method and apparatus, and a storage medium, and more particularly to: a method of converting image data into high frequency components and low frequency components of a plurality of frequency bands and apparatus therefor; an image composition method of reconstructing the image data from the high frequency components and low frequency components and method therefor, an image data compression method of obtaining compressed data by compressing the high frequency components and low frequency components and apparatus therefor, an image decompression method of decompressing the compressed data and apparatus therefor, an image processing method of and apparatus for performing image processing employing an image transformation method and apparatus therefor and an image composition method of and apparatus therefor, as well as a computer readable storage medium for recording a program causing a computer to execute an image transformation method, an image composition method, an image compression method and an image decompression method.

2. Description of the Related Art

The practice of obtaining image data, subjecting the obtained image data to appropriate image processing, and then reproducing the image data is in wide use in various fields. One such proposed method of processing image data utilizes multiple-resolution transformation, and comprises converting an image into multiple-resolution images of a plurality of frequency bands, subjecting the image from each frequency band to a predetermined processing, and by performing reverse transformation on the processed images, obtaining a final processed image. The processing employed in this case, more specifically, comprises separating the high frequencies in order to remove noise, and performing compression processing by removing the data of frequency bands high in noise, etc.

In addition, wavelet transform, Laplacian Pyramid transform, and Fourier transform are known methods of performing multiple-resolution transformation. In particular, although wavelet transform is one method of analyzing// breaking down the frequencies of a signal, compared to the widely used Fourier transform, which is similar method of breaking down frequencies, because of the point that the ease with which locally changed data is detected is superior, wavelet transform has been in the limelight in recent years in just about every signal processing field (refer to: Oliver Rioul and Martin Vetterli, "Wavelets and Signal Processing", IEEE SP Magazine, pp. 14-38, October 1991; Stephane Mallat, "Zero-Crossings of a Wavelet Transform, IEEE Transactions on Information Theory, Vol. 37, No. 4, pp. 1019-1033, July 1991; Japanese Unexamined Patent Publication Nos. 6(1994)-274614, 6(1994)-350989, 6(1994)-350990, 7(1995)-23228, 7(1995)-23229 and 7(1995)-79350.

According to the wavelet transforms disclosed in aforementioned Japanese Unexamined Patent Publication No. 6(1994)-274614, etc., by repeatedly performing a one-dimensional wavelet transform while sub-sampling vertically and horizontally is carried out, a multiple-resolution image such as that shown in FIG. 18 is obtained; this is called a tensor multiplied type two-dimensional wavelet transform. On the other hand, a method in which a wavelet transform is performed while sub-sampling is carried out in a checkered pattern (refer to The Red-Black Wavelet Transform, Greet Uytterhoeven, Adhemar Bultheel, Katholieke Universiteit Leuven, Report TW271, December 1997). This type of method, in which "lifting" is utilized, is called an unseparated-type wavelet transform, and for cases in which as shown in FIG. 19, pixels are disposed at vertical and horizontal, etc., intervals (hereinafter referred as square-patterned disposition), and a wavelet transform is repeatedly performed while the image is separated into an image formed of pixels disposed only at the positions indicated by an 'O' or 'X' mark. Hereinafter, this unseparated-type wavelet transform utilizing lifting will be explained. Note that when pixels are disposed only at positions indicated by the O and X marks as in FIG. 19, this is called checkered disposition.

FIG. 20 is provided for explanation of wavelet transform dependent on lifting. Note that for the sake of simplicity in explanation, a case in which a wavelet transform is performed on one-dimensional data is explained. First, one-dimensional data $\lambda j$, i (here, the frequency band becomes a low frequency band corresponding to the high-low represented by j, and i is the element number) are separated into an odd-number component $\lambda j$, $2i+1$ formed of the pixels of the odd-number positions, and an even-number component $\lambda j$, $2i$ formed of the pixels of the even-number positions. Then, the even-number component $\lambda j$, $2i$ is subjected to low-pass filtering by low-pass filter LP1, and the resultant is subtracted from the odd-number component $\lambda j$, $2i+1$; the component obtained by the subtraction operation is the high-frequency component $\lambda j+1$. On the other hand, high-frequency component $\lambda j+1$ is subjected to low-pass filtering by low-pass filter LP2, and the resultant is added to even-number component $\lambda j$, $2i$; the component obtained from the addition operation is the low-frequency component $\lambda j+1$. Then, by repeatedly subjecting the obtained low-frequency component $\lambda j+1$ to the same type of processing, data $\lambda j$, I can be wavelet transformed.

On the other hand, reverse transformation of the data obtained by wavelet transform dependent on lifting is performed as described below. FIG. 21 is provided for explanation of reverse transformation of data obtained by a wavelet transform dependent on lifting. Note that, here, an explanation for a case in which is data $\lambda j$, i is obtained from high-frequency component $\lambda j+1$ and low-frequency component $\lambda j+1$ will be given. Reverse transformation comprises performing processing completely the reverse of the wavelet transform shown in FIG. 20: high-frequency component $\lambda j+1$ is subjected to low-pass filtering by low-pass filter LP2, and the resultant is subtracted from low-frequency component $\lambda j+1$, whereby even-number component $\lambda j$, $2i$ is obtained; on the other hand, even-number component $\lambda j$, $2i$ is subjected to low-pass filtering by low pass filter LP1, and the resultant is added to high-frequency component $\lambda j+1$, whereby odd-number component $\lambda j$, $2i+1$ is obtained; then even-number component $\lambda j$, $2i$ and odd-number component $\lambda j$, $2i+1$ are combined to obtain data.

By repeatedly performing this type of lifting-dependent wavelet transform on a two-dimensional image, as that shown in FIG. 22, a multiple-resolution image is obtained. Note that in FIG. 22, the wavelet transform is repeated four times, and the low frequency component is shown as Li and the frequency component is shown as Hi (i=1–4). Note that by subjecting two-dimensional data to a lifting-dependent wavelet transform and carrying out the data sub-sampling in a checkered pattern, an unseparated-type wavelet transform can be realized, and by this unseparated-type wavelet transform, the high-frequency component Hi and the low-frequency component Li obtained in each step of the wavelet transform become arranged as elements (because it is not image data and cannot be called a pixel, it is hereinafter called an element) in a checkered pattern. In FIG. 22, because the high-frequency component Hi and the low-frequency component Li obtained in each step of the wavelet transform are shown arranged as elements in a square-pattern, high-frequency components H1, H3 and low-frequency components L1, L3 are shown rotated by 45°.

According to this unseparated-type wavelet transform utilizing lifting, the low-frequency component L4 obtaining in the final step and the high-frequency components Hi of all of the frequency bands are saved, and by performing reverse wavelet transformation on these, the original image can be completely reproduced.

On the other hand, the object of performing a wavelet transform is to separate the image into correlated low frequency components and to reduce the power of each component by performing multiple resolution transformation on the image. Because of this, it is preferable that the value of the elements of which the high-frequency components obtained in the wavelet transform are constructed is concentrated at 0. For example, for cases in which a wavelet transform is employed to compress an image, the compression ratio is improved as the number of elements whose value is 0 or close to 0 becomes greater, and for an image of the same compression ratio, the deterioration to the image quality is less.

Here, the comparative effect on the high-frequency component for tensor-multiplied type wavelet transforms and unseparated-type wavelet transforms utilizing lifting are shown in Chart 1 below. Note that, here, for both aforementioned types of wavelet transforms, when the low-frequency components have become 1/16 the size of those of the original image, the ratio of the high-frequency components whose absolute value have become less than a predetermined value (1, 2, 3) has been obtained, and the comparison of this ratio is shown.

CHART 1

|  | =0 | ≦1 | ≦2 |
|---|---|---|---|
| Image 1 | | | |
| Tensor-multiplied Type | 8.56% | 21.58% | 30.06% |
| Unseparated-type | 9.10% | 22.25% | 30.35% |
| Image 2 | | | |
| Tensor-multiplied Type | 4.96% | 12.89% | 18.70% |
| Unseparated-type | 4.96% | 12.08% | 16.99% |

As shown in Chart 1, there are many elements in the image 1 subjected to an unseparated-type wavelet transform utilizing lifting whose value is 0 or close to zero, and a favorable result is thereby attained; however, the result obtained in the image 2, which has been subjected to a tensor-multiplied wave transform, the result is more favorable. This is because image 1 is a natural body and there is no anisotropy with respect to the horizontal and vertical directions, whereas image 2 is a building or man-made object, in which there is substantial anisotropy in the horizontal and vertical directions, and for images having anisotropy, such as image 2, it is easy for the value of the high-frequency component of the direction along the edge to become a value close to 0 with the performance of a tensor-multiplied wavelet transform, which has anisotropy in the same directions.

In this way, because there is no anisotropy in an unseparated-type wavelet transform utilizing lifting, when there is no image anisotropy, many high-frequency components having 0 or a value close to 0 can be obtained. However, for an image such as the image 2 described above having substantial anisotropy, because there are cases in which high-frequency components having a value of 0 or close to 0 can be obtained performing a tensor-multiplied wavelet transform, it is desirable that for images having substantial anisotropy as well, many high-frequency components having a value of 0 or close to 0 are obtained.

SUMMARY OF THE INVENTION

The present invention has been developed in consideration of the circumstances described above, and it is a primary objective of the present invention to provide a an image transformation method of and apparatus for obtaining high-frequency components having a value of 0 or close to zero, regardless of whether or not an image has anisotropy.

It is a further object of the present invention to provide an image composing method of and apparatus for composing image data from the components of all frequency bands obtained by use of the image transformation method and apparatus therefor according to the present invention.

It is a still further objective of the present invention to provide an image compression method and apparatus therefor for compressing the components of a plurality of frequency bands obtained by use of the image transformation method and apparatus therefor according to the present invention, as well as an image decompression method and apparatus therefor for decompressing the components of a plurality of frequency bands obtained by use of the image transformation method and apparatus therefor according to the present invention.

It is a yet further objective of the present invention to provide an image processing method and apparatus for subjecting image data to image processing employing the image transformation method and apparatus therefor as well as the image composition method and apparatus therefor according to the present invention.

Still further, it is an object of the present invention to provide a computer readable storage medium for recording a program causing a computer to execute the image transformation method, image composition method, image compression method, image decomposition method and image processing method according to the present invention.

The image transformation method according to the present invention comprises subjecting image data to separation processing to separate the high frequency component and low frequency component thereof, obtaining the high-frequency and low frequency component of a low-frequency band one step lower, by subjecting said low-frequency component to aforementioned derecomposing process, and by repeatedly subjecting the low frequency component of said one-step lower low frequency band to aforementioned derecomposing process until the low-frequency component and high-frequency component of a predetermined frequency band is obtained, aforementioned image data is transformed into the high-frequency components and low frequency components of a plurality of frequency bands, wherein aforementioned derecomposing process separates aforementioned image data or low-frequency component into checkered pattern component 1 and component 2, and dummy-setting the signal value occurring at the position of the hole of aforementioned component 1, corresponding to the direction of the signal change of aforementioned component 1, and obtaining a dummy setting component, obtaining the difference component between aforementioned component 2 and aforementioned dummy setting component as the high-frequency component, dummy-setting and obtaining an addition dummy setting component by performing weighted addition on the signal occurring at the position of said high-frequency component with the signal of the surrounding vicinity thereof, and obtaining aforementioned low frequency component by adding said addition dummy setting component to aforementioned component 1.

The expression "component 1 and component 2 are separated into a checkered pattern" refers to, for cases in which, as shown in FIG. 19, the elements composing the image data or the low frequency component are arranged in a square pattern, separating the image data or low-frequency component into a component formed of elements of the positions indicated by an O mark and a component formed of elements of the positions indicated by an X mark. Note that according to the separation processing according to the present invention, a low-frequency component is obtained as elements having a checkered pattern, however, to again separate component 1 and component 2 into checkered pattern from here, by rotating by 45° the low frequency component having elements disposed in a checkered pattern or by rotating the sampling direction by 45°, the elements composing the low-frequency component can be arranged so as to be considered as arranged in a square pattern. In addition, when the elements composing image data are arranged in a checkered pattern, by rotating by 45° the image data having elements disposed in a checkered pattern or by rotating the sampling direction by 45°, the elements composing the image data can be arranged so as to be considered as arranged in a square pattern, and component 1 and component 2 can be separated.

The expression "the position of the hole of component 1" refers to, as shown in FIG. 19, for cases in which the component indicated by the O mark is component 1, the position indicated by the X mark.

The expression "the position of the hole of component" refers to, as shown in FIG. 19, for cases in which the component indicated by the X mark is component 2, the position indicated by the O mark.

Conventionally, the signal value occurring at the hole of component 1 constitutes component 2, and the signal value occurring at the hole of component 2 constitutes component 1, however, the expression "dummy setting component" refers to the signal value occurring at the hole of component 1 obtained without using component 2 whatsoever. Note that there are cases for which the value of the dummy setting component and the value of component 2 differ. Therefore, according to the present invention, by obtaining the difference component of the dummy setting component and component 2, a component closer to the conventional value is obtained as a high-frequency component.

Although the high-frequency component of the signal value occurring at the position of the hole of component 2 is the high-frequency component of component 1, the expression "addition dummy setting component" refers to the signal value of the high-frequency component occurring at the hole position of the high-frequency component (that is, the hole position of component 2) obtained without using component 1 whatsoever.

The image composition method according to the present invention comprises the steps of obtaining high-frequency components of all the frequency bands and a low-frequency component of the lowest frequency band using the image transformation method of the present invention, recomposing a high-frequency component of the lowest frequency band and the low-frequency component of the lowest frequency band into a low-frequency component of a 1-step high frequency band, repeating the step of recomposing now for a high-frequency component of the 1-step high frequency band and the low-frequency component of the 1-step high frequency band until desired recomposed image data is obtained; wherein the recomposing process sets and obtains an addition dummy setting component by performing weighted addition on the signal value occurring at the position of the hole of the high-frequency component of a frequency band subjected to said recomposing process and the signal value occurring in the vicinity surrounding said hole position, and obtains a component 1 as the difference component of the low-frequency component of a frequency band subjected to the recomposing process and aforementioned addition dummy setting component, and obtains the signal value occurring at the hole position of aforementioned component 1 according to the direction of the signal change of said component 1, and obtains a component 2 by adding the high-frequency component of a frequency subjected to the recomposing process to said dummy setting component, and obtains the low-frequency component of a 1-step high frequency band one step higher than the low-frequency component of a frequency band of component 1 and component 2 arranged in a checkered pattern that has been subjected to the recomposing process.

Here, because the low-frequency component and the high-frequency component are obtained as components having elements arranged in a checkered pattern, the component 1 and the component 2 are also components having elements of a checkered pattern. Accordingly, the expression "component 1 and component 2 are arranged in a square shape" refers to obtaining a low-frequency component in which the positions indicated by an O mark and the positions indicated by an X mark both have elements by making the hole positions of each of the elements of the component 1 and the component 2, which have elements arranged in a checkered pattern, the elements of their respective counterpart. Note that according to the recomposing process of the present invention, although a low-frequency component is obtained as a component having elements arranged in a square shape, to combine this with a high-frequency component having elements disposed in a checkered pattern, by rotating the low-frequency component composed of elements disposed in a square shape 45° or the by rotating the sampling direction 45°, the elements composing the low-frequency component can be considered to be disposed in a checkered pattern.

The first image compression method of the present invention comprises compressing image data and obtaining compressed data, wherein the high-frequency components of a plurality of frequency bands and the low-frequency component of the lowest frequency band of aforementioned image data are obtained by subjecting said image data to the image transformation processing according to the present invention, and the high-frequency components of all frequency bands and the low frequency band of the lowest frequency band are subjected to compression processing and compressed data is obtained.

Here, either reversible or irreversible compression processing may be performed as the compression processing. According to irreversible compression processing, after quantifying the high-frequency components of all frequency bands and the low-frequency component of the lowest frequency band, the data is subjected to Huffman encoding, arithmetic encoding, and entropy encoding. According to reversible compression processing, quantification is not performed, and the high-frequency components of all frequency bands and the low-frequency component of the lowest frequency band are subjected to entropy encoding.

The first image decompression method according to the current embodiment comprises decompressing compressed data compressed by the first image compression method according to the present invention, and obtains the high-frequency components of all the frequency bands and the low-frequency component of the lowest frequency band, and combines, by use of the image composition method according to the present invention, said high-frequency components of all the frequency bands and the low-frequency component of the lowest frequency band to reconstruct aforementioned image data.

For cases in which image data has been subjected to irreversible compression processing, the decompression processing consists of subjecting the compressed data to entropy decoding, and then obtaining the high-frequency components of all the frequency bands and the low-frequency component of the lowest frequency band by reverse quantification. In this case, the obtained high-frequency components of all the frequency bands and the low-frequency component of the lowest frequency band are of an more inferior quality, corresponding to the degree of quantification, than the high-frequency components of all the frequency bands and the low-frequency component of the lowest frequency band before subjection thereof to compression processing. On the other hand, for cases in which the image data has been subjected to reversible compression, the decompression processing consists of subjecting the compressed data to entropy decoding and obtaining the high-frequency components of all the frequency bands and the low-frequency component of the lowest frequency band.

The second image compression method of the present invention comprises compressing image data having elements arranged in a checkered pattern and obtaining compressed data, wherein the high-frequency components of a plurality of frequency bands and the low-frequency component of the lowest frequency band of aforementioned image data are obtained by subjecting said image data to the image transformation processing according to the present invention, and the high-frequency components of all frequency bands and the low frequency band of the lowest frequency band have the same element arrangement as aforementioned image data, and the value of all elements is subjected to compression processing against a component of 0 and compressed data is obtained.

The expression "the value of all elements is subjected to compression processing against a component of 0" refers to the arranging of elements having the same arrangement as in the image data into a checkered pattern of elements having a value of 0.

The second image decompression method according to the current embodiment comprises decompressing compressed data compressed by the second image compression method according to the present invention, and obtains the component composed of all elements having a value of 0 and the high-frequency components of all the frequency bands and the low-frequency component of the lowest frequency band, and combines, by use of the image composition method according to the present invention, said component composed of all elements having a value of 0, said high-frequency components of all the frequency bands and the low-frequency component of the lowest frequency band to reconstruct aforementioned image data.

Note that according to the second decompression method of the present invention, by combining the high-frequency component of all the frequency bands and the low-frequency component of the lowest frequency band by use of the image composition method according to the present invention, image data having elements arranged in a checkered pattern can be reconstructed. Then, by again combining the image data having elements arranged in a checkered pattern and the component composed of all elements having a value of 0 (in this too, the elements become arranged in a checkered pattern) by use of the image composition method according to the present invention, finally, a component having elements arranged in a square shape is obtained. Here, because the component obtained in the end has elements arranged in a square shape, it is not the same as the image data. According to the present invention, this component having elements arranged in a square shape is called the image data reconstructing data.

Here, on a printer, monitor or other image output device, the elements composing the image are arranged in a square shape. Because of this, when image data formed of elements arranged in a checkered pattern is input to an image output device, the checkered arrangement of said elements must be converted to a square-shaped arrangement. On the other hand, when compressing image data formed of elements arranged in a checkered pattern, as in the second image compression method according to the present invention, the arrangement of the elements I the same as that of the image data, and furthermore, by compressing the component composed of all elements having a value of 0 together with the high-frequency components of all the frequency bands and the low frequency component of the lowest frequency band, if the compressed image data is decompressed according to the second image decompression method according to the present invention, image data reconstructing data formed of elements arranged in a square shape can be obtained. Because of this, the need to convert, at image out put devices, image data formed of elements arranged in a checkered pattern to image data formed of elements arranged in a square pattern is eliminated. In addition, because images can be output at image output devices without consideration as to the arrangement of the elements of the image data before compression, the need to perform image processing according to the arrangement of the elements is eliminated, and therefore, the image output devices can be of a simple configuration.

The image processing method according to the present invention comprises subjecting image data to image processing and obtaining processed image data, wherein the high-frequency components of a plurality of frequency bands and the low-frequency component of the lowest frequency band are obtained and at least one of the high-frequency components from among all of the frequency bands and/or the low frequency component o the lowest frequency band is subjected to aforementioned image processing, and the component(s) subjected to said image processing and other components are combined by the image composition method according to the present invention and aforementioned processed image data is reconstructed.

The expression "predetermined image processing" can refer any of various image processing processes, such as blurring-mask processing, step processing, enhancement processing, changing the value of elements processing, and so on, which has been determined in advance. The image transforming apparatus according to the present invention comprises a separation processing means for subjecting image data to separation processing and separating said image data into a high-frequency component and low frequency component, wherein aforementioned low-frequency component obtained by said separation processing is further subjected to separation processing and a high-frequency component and a low-frequency component of a 1-step low frequency band, which is one step lower than said low-frequency component, and by repeatedly subjecting the high-frequency component and the low-frequency component of said 1-step low-frequency band obtained by said separation processing to separation processing until the high-frequency component and the low-frequency component of a predetermined frequency band are obtained, aforementioned image data can be transformed into the high-frequency components of a plurality of frequency bands and the low-frequency component of the lowest frequency band, and which further comprises a checkered pattern for separating aforementioned image data or aforementioned low-frequency component into a component 1 and a component 2 arranged in a checkered pattern, a dummy setting means for dummy setting the signal value occurring at the hole position of aforementioned component 1, according to the direction of the signal change of component 1, and obtaining a dummy setting component, a difference obtaining means for obtaining the difference component of aforementioned component 2 and aforementioned dummy setting component as aforementioned high-frequency component, a weighted-addition performing means for obtaining an addition dummy setting component by performing weighted-addition on the signal value occurring at the hole position of said high-frequency component and the signal value occurring in the vicinity surrounding said hole position, and an adding means for adding said addition dummy setting component to aforementioned component 1 and obtaining aforementioned low-frequency component.

The image composing means according to the present invention comprises a recomposing process means for obtaining the low-frequency component of a 1-step high frequency band, which is one step higher than the lowest frequency band, by subjecting the high-frequency component the lowest frequency band and the low-frequency component of the lowest frequency band, from among the high-frequency components of all the frequency bands and the low-frequency component of the lowest frequency band obtained by the image separation processing according to the present invention, to recomposing process, wherein by repeatedly subjecting the low-frequency component of said 1-step high-frequency and the high-frequency component of said 1-step high frequency band to said recomposing process until aforementioned image data is obtained, said image data can be reconstructed, and which further comprises a weighted-addition performing means for obtaining an addition dummy setting component by performing weighted-addition on the signal value occurring at the hole position of the high-frequency component of the frequency band subjected to aforementioned recomposing process and the signal value occurring in the vicinity surrounding said hole position, a difference obtaining means for obtaining the difference component of the low-frequency component of the frequency band subjected to aforementioned recomposing process and aforementioned addition dummy setting component as aforementioned component 1, a dummy setting means for dummy setting the signal value occurring at the hole position of aforementioned component 1, according to the direction of the signal change of component 1, and obtaining a dummy setting component, an adding means for adding said dummy setting component to the high-frequency component of the frequency band subjected to aforementioned recomposing process and obtaining aforementioned component 2, and a composing means for arranging aforementioned component 1 and aforementioned component 2 in a square pattern, and obtaining the low-frequency component of a 1-step high-frequency band, which is one step higher than the low-frequency component of the frequency band subjected to aforementioned recomposing process.

The first image compression apparatus according to the present invention is an image compression apparatus for compressing image data and obtaining compressed data, and comprises an image transforming apparatus according to the present invention, and a data compressing means for obtaining aforementioned compressed data by subjecting the high-frequency components of all the frequency bands and the low frequency component off the lowest frequency band obtained by said image transforming apparatus to data compression processing.

The first image decompression apparatus according to the present invention comprises a data decompressing apparatus for decompressing the compressed data obtained by the first image compressing apparatus according to the present invention and obtaining the high-frequency components of all the frequency bands and the low frequency component off the lowest frequency band, and an image composing apparatus according to the present invention, wherein aforementioned high-frequency components of all the frequency bands and the low frequency component off the lowest frequency band are combined by the image composing means and aforementioned image data is reconstructed.

The second image compression apparatus according to the present invention is an image compression apparatus for compressing image data formed of elements arranged in a checkered pattern and obtaining compressed data, and comprises an image transforming apparatus according to the present invention, and a data compressing means for obtaining aforementioned compressed data by subjecting the high-frequency components of all the frequency bands and the low frequency component off the lowest frequency band obtained by said image transforming apparatus together with the component composed of all elements having a value of 0 and which are arranged the same as those of aforementioned image data to data compression processing.

The second image decompression apparatus according to the present invention comprises a data decompressing apparatus for decompressing the compressed data obtained by the second image compressing apparatus according to the present invention and obtaining the high-frequency components of all the frequency bands and the low frequency component off the lowest frequency band, and an image composing apparatus according to the present invention, wherein aforementioned component composed of all elements having a value of 0, the high-frequency components of all the frequency bands and the low frequency component off the lowest frequency band are combined by the image composing means and aforementioned image data is reconstructed.

The image processing apparatus according to the present invention is an image processing apparatus for subjecting image data to image processing and obtaining processed image data, and comprises an image transforming apparatus according to the present invention, a processing means for subjecting at least one of the high-frequency components from among all of the frequency bands and/or the low frequency component of the lowest frequency band from among the high-frequency components of a plurality of frequency bands and the low-frequency component of the lowest frequency band obtained by aforementioned image transforming apparatus to aforementioned image processing, and an image composing apparatus according to the present invention, wherein component(s) subjected to said image processing and other components are combined by the image composing apparatus and aforementioned processed image data is reconstructed.

Note that the image transformation method, the image composing method, the first and second image compression methods, the first and second image decompression methods and the image processing method may each be provided as a program causing a computer to execute the respective method recorded on a computer readable storage medium.

According to the image transformation method and apparatus therefor according to the present invention, because the signal value occurring at the hole position of component 1, corresponding to the direction of the signal change of component 1, is dummy-set and a dummy setting component is obtained, even if the anisotropy of an image is large, the dummy setting component can be made to have a value close to that of component 2. Because of this, if the difference component of the difference between the dummy setting component and component 2 is obtained as the high-frequency component, the high-frequency component comes to contain many elements having a value close to zero. Accordingly, regardless of whether an image has anisotropy or not, a high-frequency component containing many elements having a value close to zero can be obtained.

In addition, by this, because the high-frequency component obtained by an image transformation method and apparatus according to the present invention contains many elements whose value is 0 or close to 0, if the high-frequency components of all frequency bands and the low frequency component of the lowest frequency band are compressed, compressed data having a high compression ratio can be obtained.

Further, when a certain image is subjected to multiple-resolution transformation, if comparatively strong edges occur within the image, because high-frequency components and low frequency components across a wide range of frequency bands are contained in the edge data, the correlation between each frequency component becomes higher. If the correlation between each frequency component becomes higher, in this way, in a case, for example, in which only the high-frequency component of a certain frequency band is subjected to image processing, because the frequency components of other frequency bands, regardless of being contained in the same data, are not subjected to image processing, when the components of each frequency band are later combined, the matchability thereof is gone, and there is a fear that artifacts occur in the reconstructed image. Further, because the same data is included within the high-frequency components spanning a plurality of frequency bands, the compressibility thereof becomes poor.

In response to this, because the signal value occurring at the hole position of component 1, corresponding to the direction of the signal change of component 1, is dummy-set and a dummy setting component is obtained, for cases in which comparatively strong edges occur within the image, the dummy setting component can be obtained so as to contain edge data in the same way as component 2, and as a result, even if comparatively strong edges occur within the image, it is difficult for the edge data to become contained in the high-frequency component. On the other hand, although edge data becomes contained in the low-frequency component, it becomes difficult, in the same way, for edge data to become contained in the high-frequency component obtained from this low-frequency component. Accordingly, the same data does not become included within the high-frequency components spanning a plurality of frequency bands, and the correlation between the high-frequency components of each frequency band and the correlation between the high-frequency component and the low-frequency component of each frequency band becomes lower. By this, the affect the processing performed on the high-frequency component of a specific frequency band has on the high-frequency component in another frequency band is eliminated, and if the image transformation method and apparatus therefor according to the present invention are implemented, the adverse effects of artifacts, etc., can be reduced. In addition, if the image transformation method and apparatus therefor according to the present invention are implemented in an image compression method, compressed data having a high compression ratio can be obtained.

DESCRIPTION OF THE PREFERRED EMBODIMENTS

Hereinafter, the preferred embodiments of the present invention will be explained, with reference to the drawings.

Figure 1:
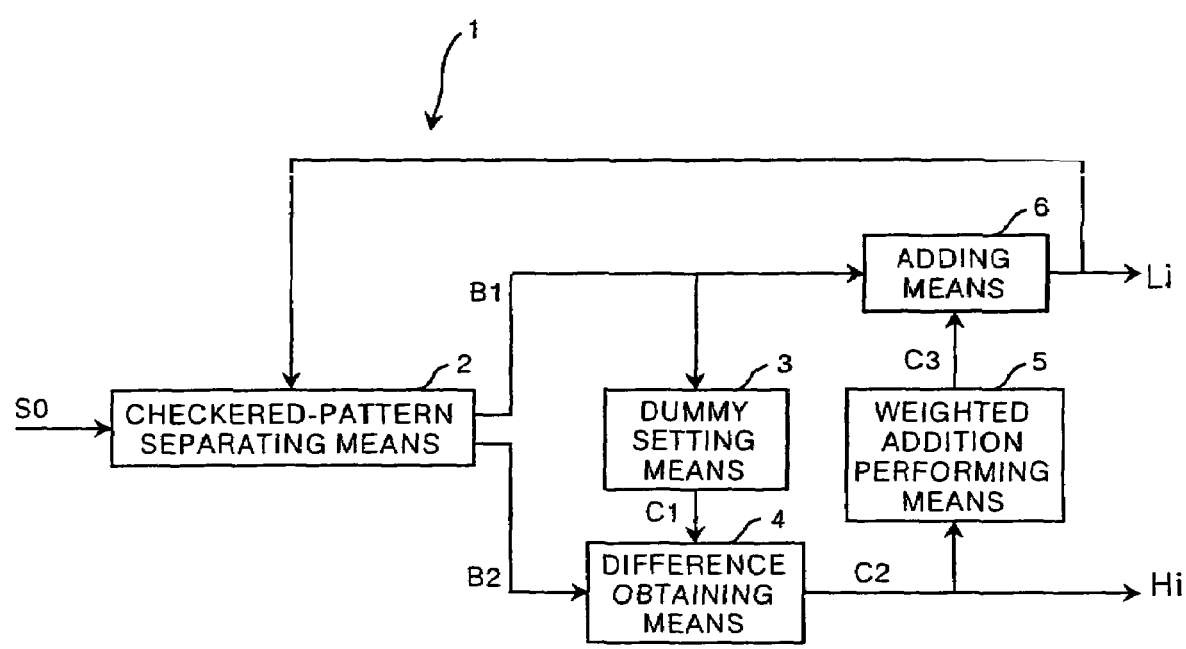
FIG. 1 is a schematic block drawing of the configuration of an embodiment of an image transforming apparatus according to the present invention.
Figure 2B:
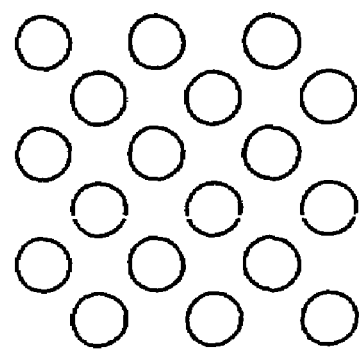
FIGS. 2A, 2B and 2C are provided for explanation of checkered separation and composition.
Figure 2A:
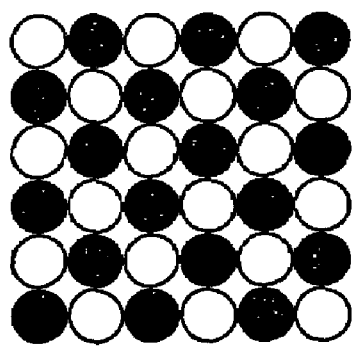
Figure 2C:
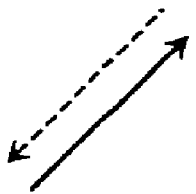
Figure 2C:
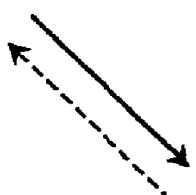
Figure 2C:
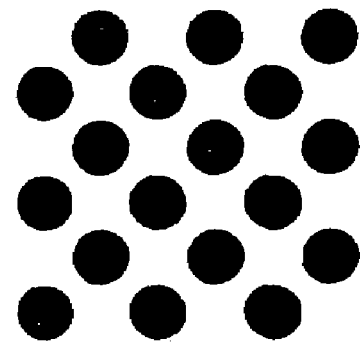

FIG. 1 is a schematic block drawing of the configuration of an image transforming apparatus according to the current embodiment. As shown in FIG. 1, the image transforming apparatus 1 according to the current embodiment of the present invention comprises a checkered-pattern separating means 2 for separating an image data S0 formed of elements arranged in a square pattern or a low frequency component Li into a first component B1 and a second component B2 formed of the elements of arranged in a checkered pattern, a dummy setting means 3 for dummy-setting the signal value occurring at the hole position of the first component B1 and obtaining a dummy setting component C1, a difference obtaining means for obtaining a difference component C2 of the second component B2 and the dummy setting component C1 as the high-frequency component Hi (i=1 to n), a weighted addition performing means 5 for setting and obtaining an addition dummy setting component C3 by performing weighted addition on the signal value of the hole position of the high-frequency component Hi, in a way described later, and an adding means 6 for adding the addition dummy setting component C3 to the first component B1 and obtaining a low-frequency component Li.

The checkered-pattern separating means 2 for separating an image data S0 formed of elements arranged in a square pattern or a low frequency component Li into a checkered pattern composed of the elements of the white round positions and the black round positions, and obtains a first component B1 formed only of the elements of the white round positions and a second component B2 formed only of the elements of the black round positions.

Figure 3:
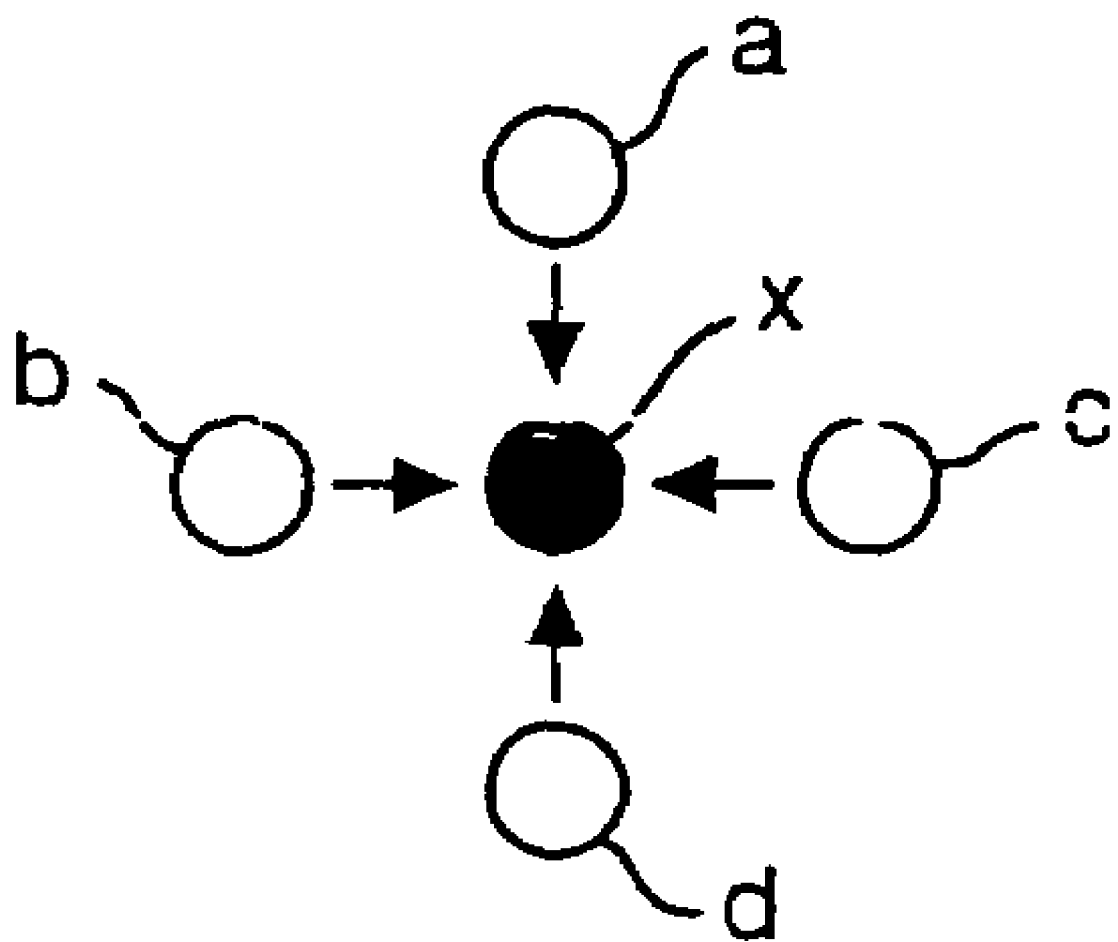
FIG. 3 is provided for explanation of obtaining a dummy setting component.

The dummy setting means 3 obtains the dummy setting component C1 as described below. FIG. 3 is a drawing provided for explanation of the obtaining of dummy setting component C1. Note that in FIG. 3, the white circles indicate the element positions first component B1, which have a signal value, and the black circles indicate the hole positions corresponding to the second component B2. As shown in FIG. 3, the dummy setting means 3 dummy sets the four signal values Sa, Sb, Sc and Sd of the four element positions a, b, c and d, which are the element positions of the vicinity surrounding the hole positions of the first component B1, that is the signal value Sx of the element position x corresponding to the element positions of the second component B2. More specifically, the signal value Sx is obtained as shown in formula 1 below:

When $|(Sa-Sd)|<|(Sb-Sc)|, Sx=(Sa+Sd)/2$;

When $|(Sa-Sd)|\geq|(Sb-Sc)|, Sx=(Sa+Sc)/2$ <1>

Here, for cases in which the element position x of which signal value Sx is obtained is above the edge contained with an image, the absolute value of the difference component of the signal value in the direction along the edge, (Sa−Sd), (Sb−Sc), becomes a small value. Accordingly, if the signal value in the direction along the edge is used, a signal value Sx having a value closer to the second component B2 can be obtained. Therefore, the practice of obtaining signal value Sx by use of the signal value of the direction in which the absolute value of the difference component is small has been adopted. Then, the signal value Sx of all the hole positions is obtained as the dummy setting component C1.

In addition, the signal value Sx can be obtained using the threshold values Th1 and Th2, as shown in formula 2 below:

When $(Sa-Sd)<Th1, Sx=(Sa+Sd)/2$

When $(Sb-Sc)<Th2, Sx=(Sb+Sc)/2$

And for all other cases, $Sx=(Sa+Sb+Sc+Sd)/4$ <2>

Here, for cases in which the image data S0 is 8-bit data, The threshold values Th1 and Th2 can be set at a value near 50.

Also, a vector (hereinafter referred to as a direction vector) showing the direction and size of the change of the signal value of the element position x of which signal value Sx has been obtained is obtained, and the signal value Sx can be also obtained based on this direction vector. Here, the direction vector is obtained as shown in formula 3 below:

$(u,v)=((Sc+Sd)-(Sa+Sb),(Sa+Sc)-(Sb-Sd))$ <3>

Accordingly, the size P of the direction vector and the direction θ can be obtained as shown in formulas 4 and 5 below:

$P=\sqrt{(u^2+v^2)}$ <4>

$\theta=\tan^{-1}(u/v)-\pi/4$ <5>

Then, this direction vector is compared to the threshold value Th, and according to the comparison result, the singal value Sx is obtained as shown in formula 6 below:

When $P<Th, Sx=Sx=(Sa+Sb+Sc+Sd)/4$

When $P\geq Th, Sx=(Sa\times\cos\theta+Sb\times\sin\theta+Sc\times\cos\theta+Sd\times\sin\theta)/(2\sin\theta+2\cos\theta)$ <6>

Here, for cases in which P≧Th, signal value Sx is obtained by performing weighted addition corresponding to the distance with element positions a, b, c and d having a direction vector and signal values Sa, Sb, Sc and Sd.

Note that here, the signal value Sx is obtained by use of the signal values Sa, Sb, Sc and Sd of the four elements of the vicinity surrounding the element position x of which the signal value Sx is obtained, however, the signal Sx can also be obtained by using the signal value of even more element positions in the vicinity surrounding element position x.

Difference obtaining means 4 obtains the second component B2, the dummy setting component C1 and the difference component C2 as shown in formula 7 below:

$$C2 = B2 - C1 \qquad <7>$$

Then, this difference component C2 is obtained as the high-frequency component Hi.

Figure 4:
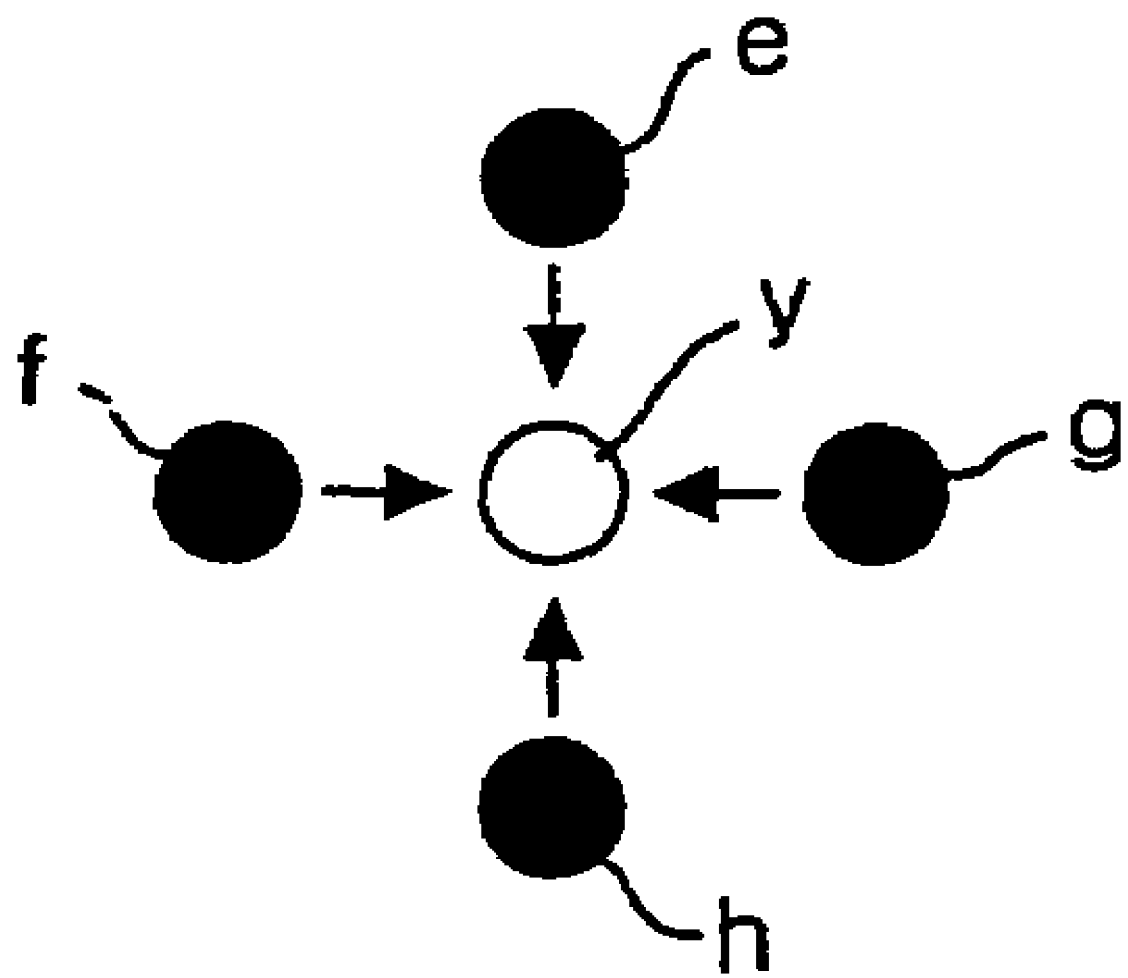
FIG. 4 is provided for explanation of obtaining a dummy addition setting component.

On the other hand, weighted addition performing means 5 obtains the addition dummy setting component C3 as follows. FIG. 4 is a drawing provided for explanation of the obtaining of the addition dummy setting component C3. Note that in FIG. 4, the black circle positions in the addition dummy setting component C3 are element positions having a signal value, and the white circle positions of the first component B1 correspond to hole positions. The weighted addition performing means 5 dummy-sets signal value Sy of the element position y formed by the hole position of the addition dummy setting component C3, that is, of the first component B1, from the signal values Se, Sf, Sg and Sh of the four element e, f, g and h in the surrounding vicinity thereof. More specifically, said signal value Sy is obtained as shown in formula 8 below, which is from the above cited document by Greet, by weighting by ⅛ and adding the signal values Se, Sf, Sg and Sh:

$$Sy = \tfrac{1}{8}(Se + Sf + Sg + Sh) \qquad <8>$$

Here, the sum of the signal values Se, Sf, Sg and Sg in formula 8 is ½, however, by setting signal value Sy in this way, aliasing can be effectively removed from the addition dummy setting component C3. Then, the signal value Sy of all the hole positions are obtained as addition dummy setting component C3.

Note that it is also conceivable that the signal value Sy of the element position y be obtained in the weighted addition performing means 5 in the same way as in the dummy setting component means 3, corresponding to the signal change of the difference component C2, however, because it is not possible to know the direction of the edge contained in an image from the difference component C2, the signal value Sy is obtained by weighting not dependent on the change of the signal value.

The adding means 6 adds the first component B1 and the addition dummy setting component C3 and obtains the low-frequency component Li as shown in formula 9 below:

$$Li = B1 + C3 \qquad <9>$$

Figure 5:
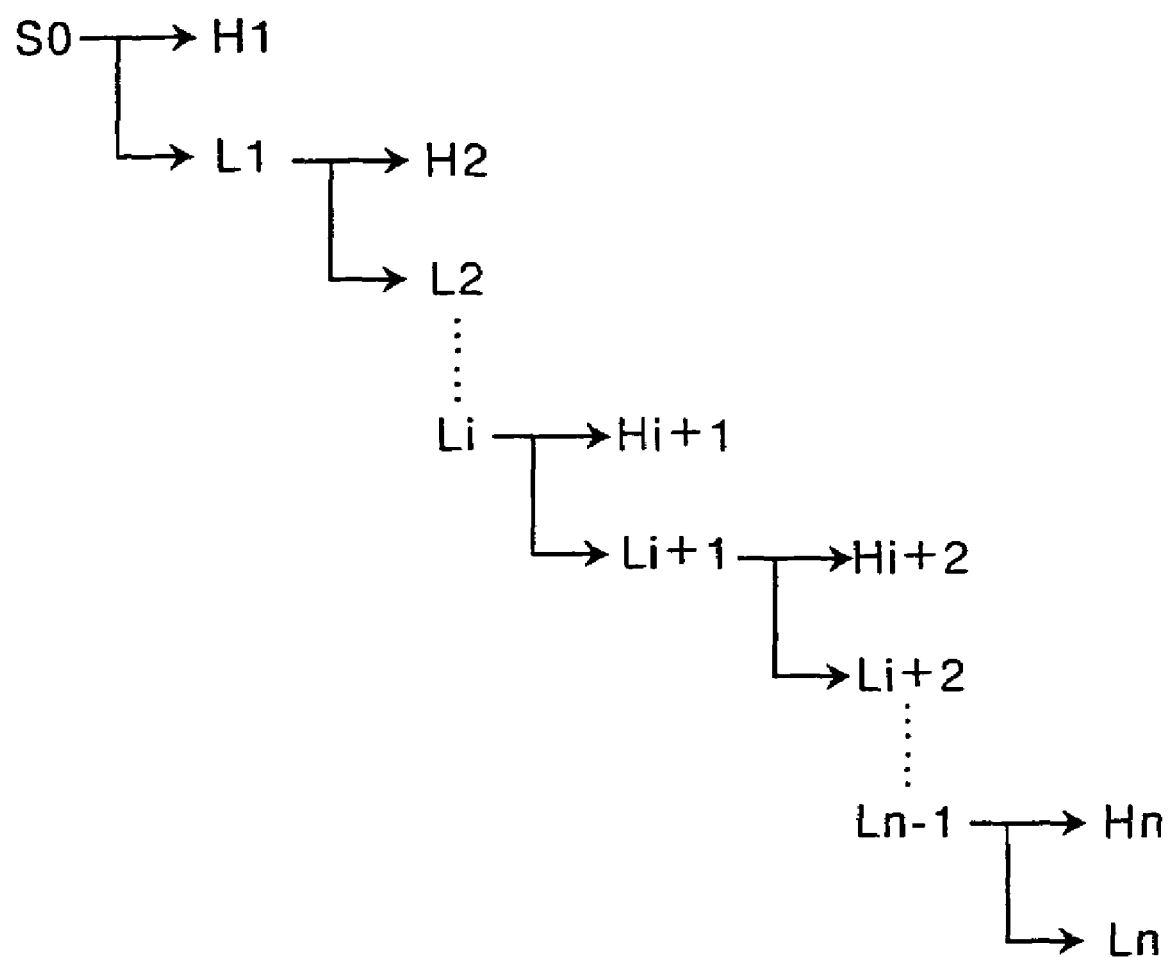
FIG. 5 shows a state in which image data has been transformed.

By first subjecting image data S0 to the above described processing, the low-frequency component Li and the high-frequency component Hi thereof are obtained. Then, by again subjecting the low-frequency component Li obtained in this way to the same processing by checkered-pattern separating means 2, dummy setting means 3, difference obtaining means 4, weighted addition performing means 5, and adding means 6 as described above, the low-frequency component L2 and the high-frequency component H2 of a 1-step low frequency band are obtained. By again subjecting the low-frequency component Li obtained of each frequency band to this processing repeatedly, as shown in FIG. 5, the image data S0 can be transformed into the low-frequency components Li and the high-frequency components Hi (where i=1~n) of a plurality of frequency bands. Note that what are saved from among the low-frequency components Li and the high-frequency components Hi obtained thereby are the low-frequency component Ln and the high-frequency component Hn of the lowest frequency band.

Note that because the elements are arranged in a checkered pattern in the low-frequency component Li, from here, in again separating the first component B1 and the second component B2 into a checkered pattern, by rotating the low-frequency component Li by 45° or by rotating the sampling direction by 45°, the processing can be carried out so that the elements composing the low-frequency component Li can be recognized as being arranged in a square pattern.

Figure 6:
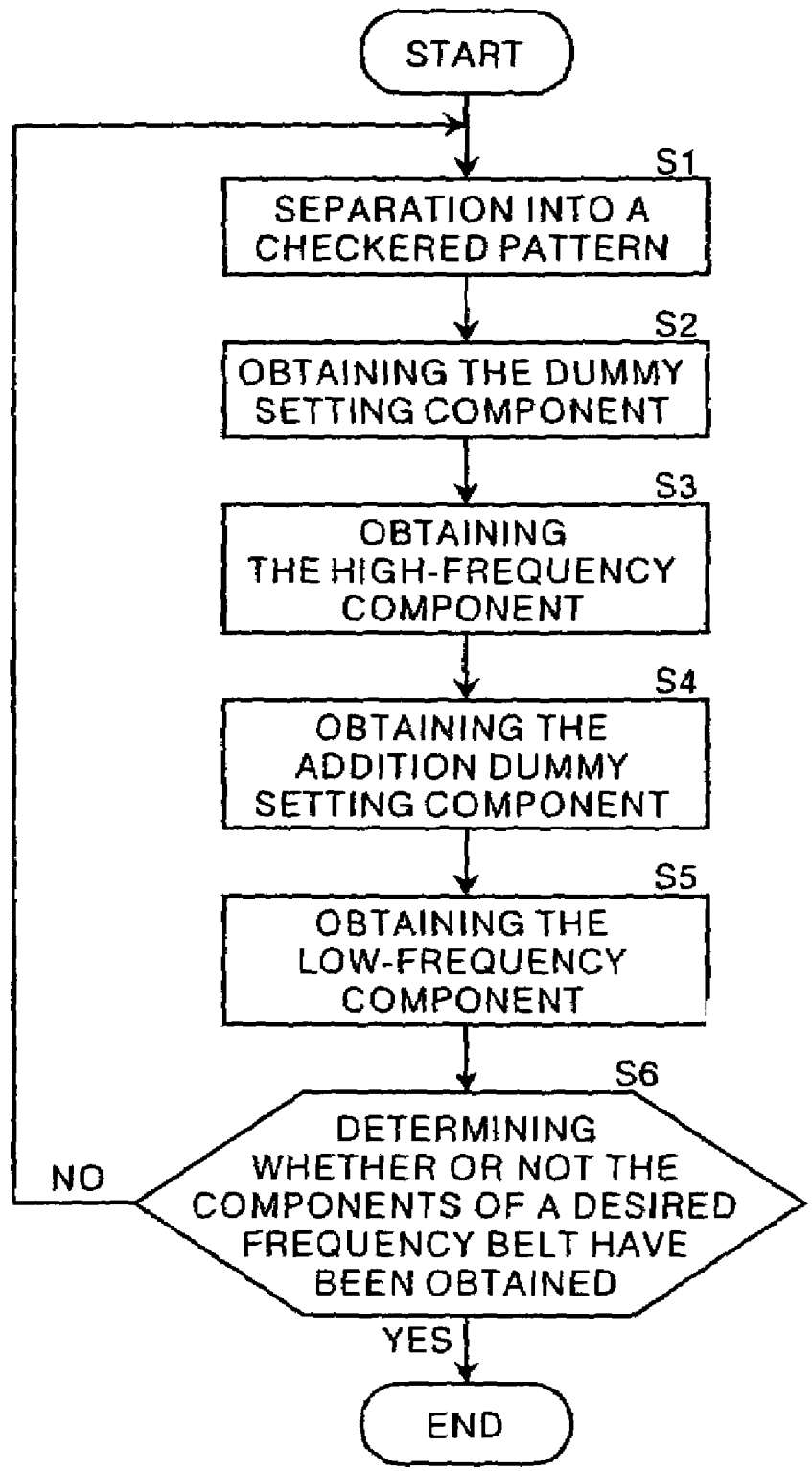
FIG. 6 is a flowchart of the operation of the image transforming apparatus according to an embodiment of the present invention.

Next, the operation of the image transforming apparatus 1 according to the current embodiment will be explained. FIG. 6 is a flow chart of the operation of the image transforming apparatus 1 according to the current embodiment. First, the image data S0 is separated into the first and second components, B1 and B2, by the checkered-pattern separating means 2 (step S1). Then, the signal value occurring at the hole position of the first component B1 is dummy-set and dummy setting component C1 is obtained by dummy setting means 3 (step S2). Dummy setting component C1 is subtracted from the second component B2 and the difference component C2, that is, the high-frequency component Hi is obtained by difference obtaining means 4 (step S3). The difference component C2 is input to the weighted addition performing means 5, wherein the signal value of hole positions of the difference component C2 are dummy-set by performing weighted addition thereon, and addition dummy setting component C3 is obtained (step S4). The addition dummy setting component C3 is added to the first component B1 by the adding means 6 and the low-frequency component Li is obtained (step S5). Then, whether or not the low-frequency components Li and the high-frequency components Hi up to a predetermined frequency band have been obtained or not is determined (step S6), and if a negative result is obtained in step S6, step S1 is returned to, and the processing from step S1 to step S6 is repeated. When a positive result is obtained in step S6, having obtained the low-frequency component Li and the high-frequency component Hi of the predetermined frequency band, the processing is complete.

In this way, according to the image transforming apparatus 1 according to the current embodiment, because the signal value occurring at the hole positions of the first component B1, corresponding to the direction of the signal change of the first component 1, are dummy-set and dummy setting component C1 is obtained, even if the image represented by the image data S0 has substantial anisotropy, the dummy setting component C1 can be made to have a value close to that of the second component B2. Therefore, if the difference component of the dummy setting component C1 and the second component B2 are obtained as the high-frequency component Hi, the high-frequency component Hi comes to contain many elements having a value of 0 or close to 0. Accordingly, regardless of whether or not the image represented by the image data S0 has anisotropy, a high-frequency component containing many elements having a value close to 0 can be obtained.

Here, a comparison of the high-frequency components obtained as a result of using aforementioned tensor-multiplied wavelet transform and the unseparated-type wavelet transform utilizing lifting, and the high-frequency component obtained as a result of using the image transforming apparatus according to the current embodiment is shown in chart 2 below. Note that here, the same as in Chart 1 the ratio of the elements, of the high-frequency component when the low-frequency component has become 1/16 the size of that of the original image, having an absolute value below a predetermined value is obtained for both sides, and the comparative result thereof is shown. Further, the images 1 and 2 are the same as those used for Chart 1.

CHART 2

|  | =0 | ≤1 | ≤2 |
|---|---|---|---|
| Image 1 | | | |
| Tensor-multiplied Type | 8.56% | 21.58% | 30.06% |
| Unseparated-type | 9.10% | 22.25% | 30.35% |
| The present invention | 9.36% | 22.90% | 31.27% |
| Image 2 | | | |
| Tensor-multiplied Type | 4.96% | 12.89% | 18.70% |
| Unseparated-type | 4.96% | 12.08% | 16.99% |
| The present invention | 5.50% | 13.30% | 18.90% |

As shown in Chart 2, for either of image 1 or image 2, there are more elements having a value of 0 or close to 0 in the results obtained by use of the image transforming apparatus 1 according to the current embodiment than for the results obtained by use of using aforementioned tensor-multiplied wavelet transform and the unseparated-type wavelet transform utilizing lifting, and therefore a favorable result has been obtained. Accordingly, the high-frequency component and the low-frequency component obtained by the image transforming apparatus according to the current embodiment can be subjected to data compression of a higher compression ratio than the components obtained by using aforementioned tensor-multiplied wavelet transform and the unseparated-type wavelet transform utilizing lifting.

In addition, when a certain image is subjected to multiple-resolution transformation, if comparatively strong edges occur within the image, because high-frequency components and low frequency components across a wide range of frequency bands are contained in the edge data, the correlation between each frequency component becomes higher. If the correlation between each frequency component becomes higher in a case, for example, in which only the high-frequency component of a certain frequency band is subjected to image processing, because the frequency components of other frequency bands in the same data are not subjected to image processing, artifacts may occur in the reconstructed image as a result of a reduced matchibility of the components of each frequency band when they are later combined. Further, because the same data is included within the high-frequency components spanning a plurality of frequency bands, the compressibility thereof becomes poor.

In response to this, according to the present invention, because the signal value Sx occurring at the hole position of the first component B1, corresponding to the direction of the signal change of the first component B1, is dummy-set and a dummy setting component C1 is obtained, for cases in which comparatively strong edges occur within the image, the dummy setting component C1 can be obtained so as to contain edge data in the same way as the second component B2, and as a result, even if comparatively strong edges occur within the image, it is difficult for the edge data to become contained in the high-frequency component Hi. On the other hand, although edge data becomes contained in the low-frequency component Li, it becomes difficult, in the same way, for edge data to become contained in the high-frequency component Hi obtained from this low-frequency component. Accordingly, the same data does not become included within the high-frequency components Hi spanning a plurality of frequency bands, and the correlation between the high-frequency components Hi of each frequency band and the correlation between the high-frequency component Hi and the low-frequency component Li of each frequency band becomes lower. Therefore, the affect the processing performed on the high-frequency component Hi of a specific frequency band has on the high-frequency component in another frequency band is eliminated, and if the image transformation method and apparatus therefor according to the present invention are implemented, the adverse effects of artifacts, etc., can be reduced. In addition, if the low-frequency component Li and the high-frequency component Hi obtained by the image transforming apparatus 1 according to the current embodiment are employed for carrying out data compression processing, the compression ratio can be improved.

Note that according to the embodiment described above, although the processing has been performed on an image data S0 formed of elements arranged in a square shape, the processing can be performed in the same way on an image data S0 formed of elements arranged in a checkered shape. In this case, in the same way as performed on the low-frequency component Li in the description of the current embodiment provided above, by rotating the elements arranged in a checkered shape by 45° or by rotating the sampling direction by 45°, the elements composing the image data S0 can be considered as being arranged in a square pattern, and the first and second components can be separated. Note that after the image data S0 has been separated once, because the first and second components become arranged in a checkered pattern, the processing subsequent thereto is performed in the same way as in the embodiment described above.

Figure 7:
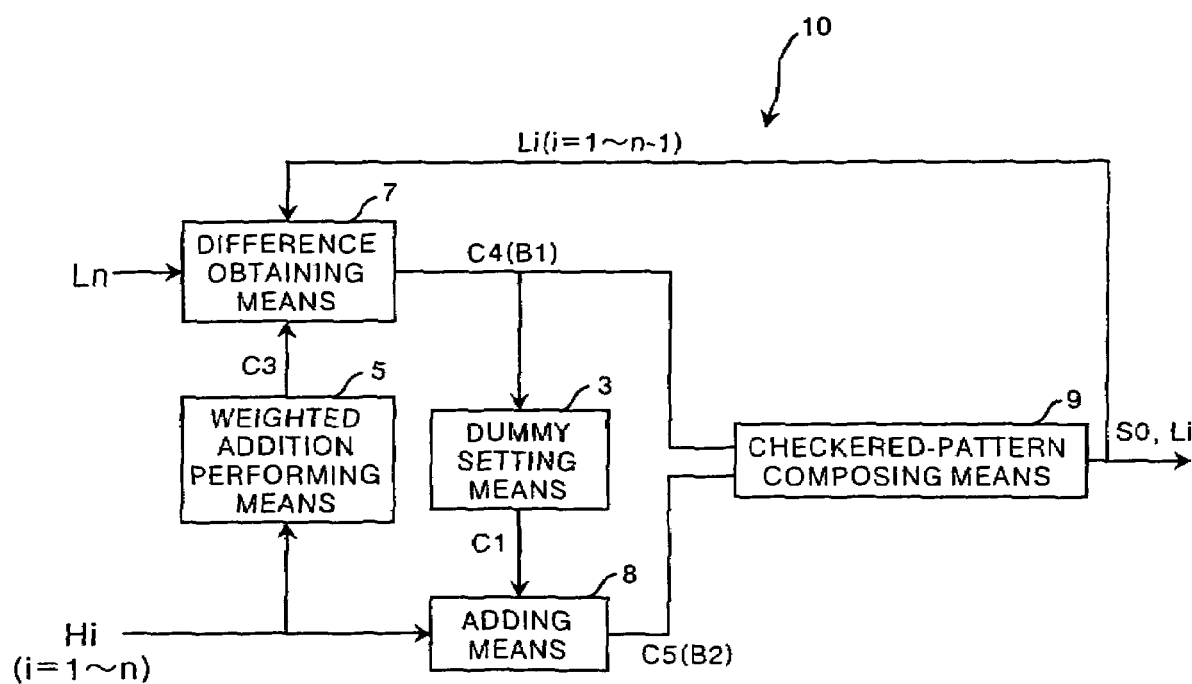
FIG. 7 is a schematic block drawing of an embodiment of an image composing apparatus according to the present invention.

Next, an embodiment of an image composing apparatus according to the present invention will be explained. FIG. 7 is a schematic block drawing of the configuration of an embodiment of an image composing apparatus according to the present invention. The image composing apparatus 10 according to the current embodiment is an image composing apparatus for reconstructing the image data S0 transformed by the image transforming apparatus 1 according to the current embodiment by combining the low-frequency component Li and the high-frequency component Hi of the lowest frequency band obtained by said transformation processing, and comprises a weighted addition performing means 5, which is the same as that of the image transforming apparatus 1 according to the current embodiment, for dummy-setting and obtaining an addition dummy setting component C3 by performing weighted addition on the signal value occurring at the hole positions of the high-frequency component Hi of a frequency band to be subjected to recomposing process, a difference obtaining means 7 for obtaining a difference component C4 of the low-frequency component Li of a frequency band to be subjected to recomposing process to the addition dummy setting component C3 as the first component B1, a dummy setting means 3, which is the same as that of the image transforming apparatus 1 according to the current embodiment, for dummy-setting the difference component C4, that is, the signal value occurring at the hole positions of the first component B1 and obtaining a dummy setting component C1, an adding means 8 for adding the dummy setting component C1 to the high-frequency component Hi and obtaining an addition component C5, and a checkered-pattern composing means 9 for combining the first component B1 and the second component B2 and obtaining the low-frequency components Li−1 of a 1-step high-frequency band.

The difference obtaining means 7 subtracts the addition dummy setting component C3 from the high-frequency component Hi and obtains a difference component C4, that is, the first component B1, as shown in formula 10 below:

$$C4 = Li - C3 \qquad <10>$$

The adding means 8 adds the dummy setting component C1 to the high-frequency component Hi and obtains an addition component C5, as shown in formula 11 below:

$$C5 = Hi + C1 \qquad <11>$$

Figure 9:
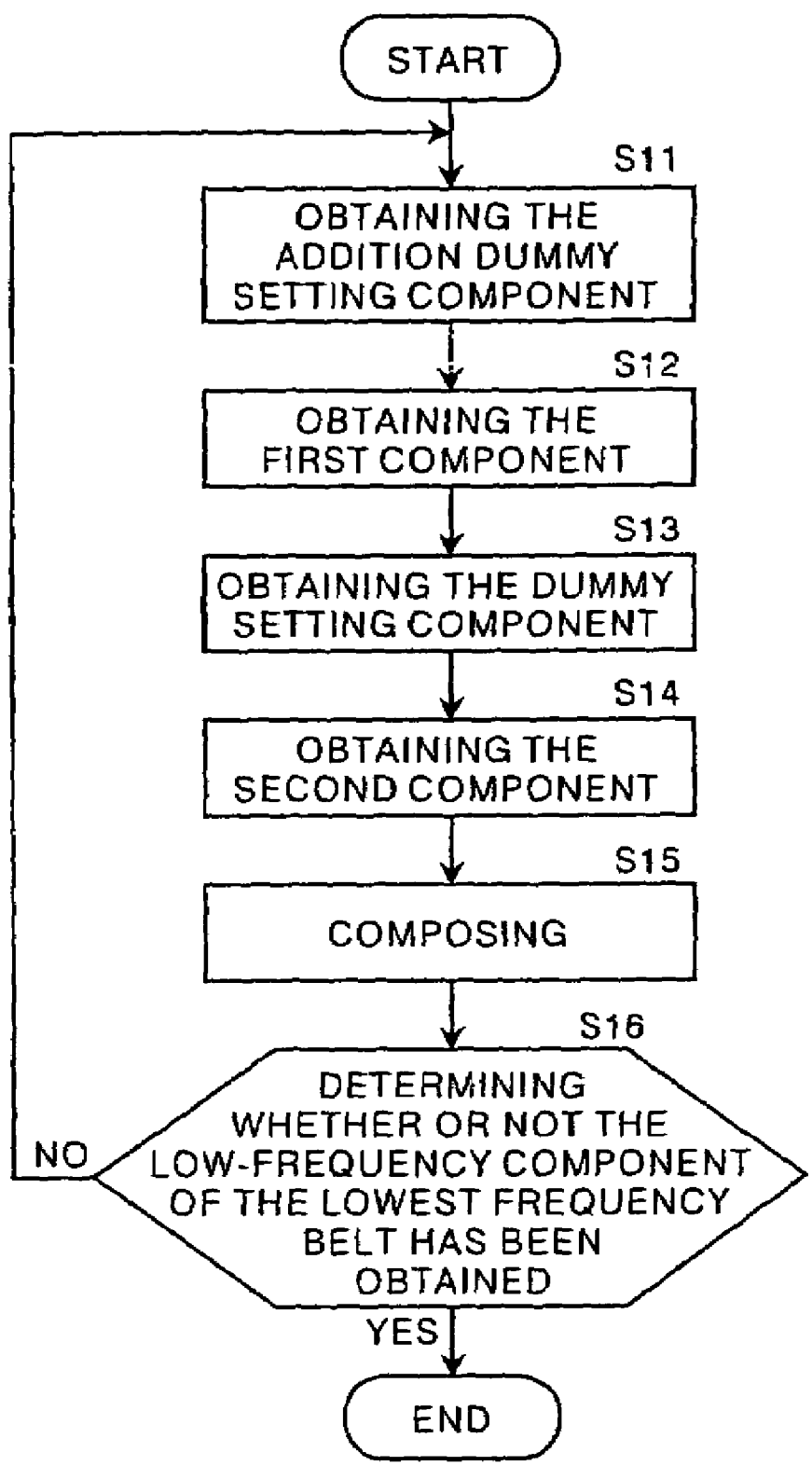
FIG. 9 is a flowchart of the operation of an embodiment of an image composing apparatus according to the present invention.

Here, the first component B1 and the second component B2 are formed of elements arranged in a checkered pattern. Therefore, the checkered pattern composing means 9 combines the first component B1, which is composed of only the elements of the round white positions, and the second component B2, which is composed of only the elements of the black round positions, as shown in FIG. 9, and obtains a low-frequency component Li-1, which has elements arranged in a square pattern, of a 1-step high-frequency band. Note that although a low-frequency component Li-1, which has elements arranged in a square pattern, of a 1-step high-frequency band is obtained by this composing processing, to arrange the elements thereof in a checkered pattern in order to match said low-frequency component Li-1 with a high-frequency component of a 1-step high-frequency band, the elements of the low-frequency component Li-1 can be made to be made to be considered as being arranged in a checkered pattern by rotating the low-frequency component Li-1 by 45° or by rotating the sampling direction by 45°.

Figure 8:
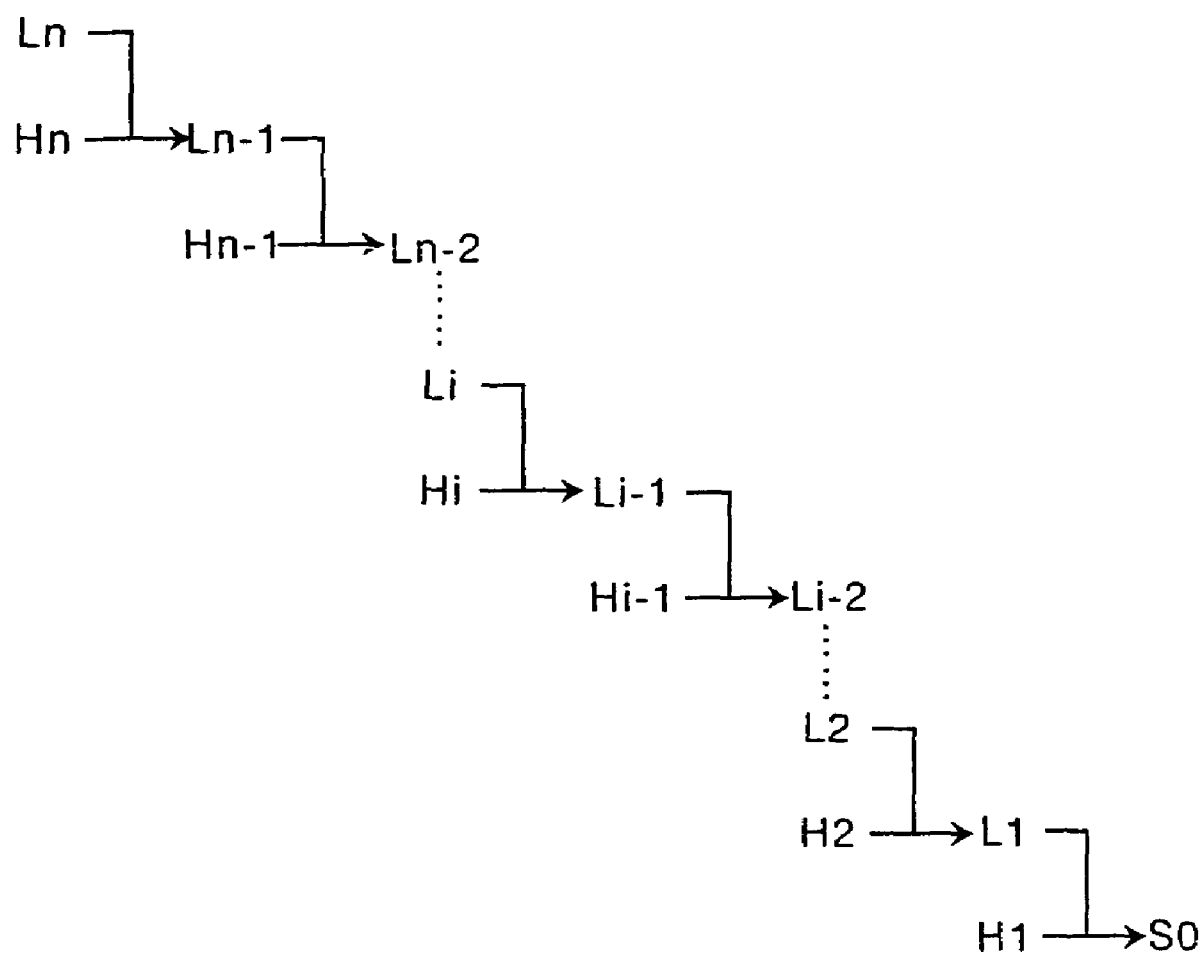
FIG. 8 shows a state in which image data has been reconstructed.

Then by again subjecting the low-frequency component Li-1 obtained in this way and the high-frequency component Hi-1, which has been saved, to processing by the difference obtaining means 7, the weighted addition performing means 5, the dummy setting means 3, the adding means 8 and the checkered-pattern composing means 9 in the same manner as described above, a low-frequency component Li-2 of a 1-step high frequency band is obtained. Then, by repeatedly performing this processing from the combining of the low-frequency component Ln of the lowest frequency band and the high frequency component Hn of the lowest frequency band to the composing of the low-frequency component of the highest frequency band, that is, the composing of the image data S0, as shown in FIG. 8, the image data S0 can be reconstructed from the low-frequency component Ln and the high-frequency component Hi.

Figure 10:
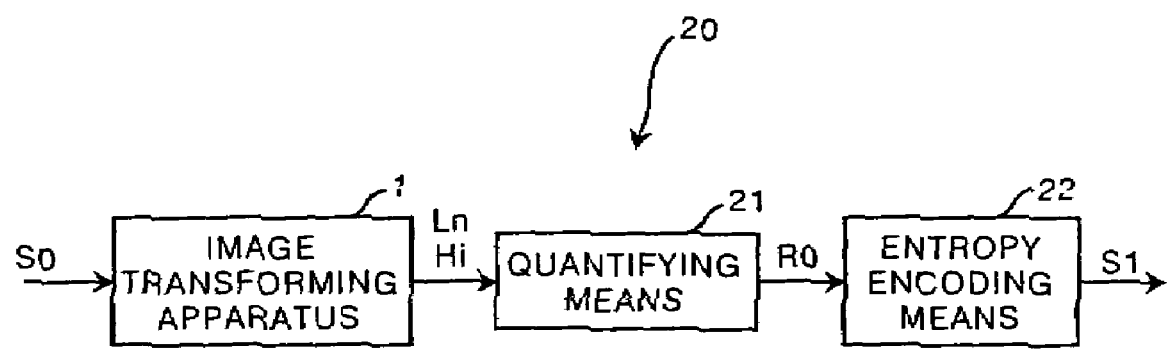
FIG. 10 is a schematic block drawing of an embodiment of an image compressing apparatus according to the present invention.

Next, the operation of the image composing means 10 according to the current embodiment will be explained. FIG. 10 is a flowchart of the operation of the image composing apparatus 10 according to the current embodiment. First, the high-frequency component Hn is input to the weighted addition performing means 5, wherein the signal value occurring at the hole position of the high-frequency component Hn dummy-set by performing weighted addition thereon, and the addition dummy setting component C3 is obtained (step S11). Then, the addition dummy setting component C3 is subtracted from the low-frequency component Ln of the lowest frequency band and the difference component C4, that is, the first component B1 is obtained by the difference obtaining means 7 (step S12). The first component B1 is input to the dummy setting means 3, wherein the signal value occurring at the hole position of the first component B1 is dummy-set and dummy setting component C1 is obtained (step S13). The dummy setting component C1 is added to the high-frequency component Hn and the addition component C5, that is, the second component B2 is obtained by the adding means 8 (step S14).

The first component B1 and the second component B2 are combined by the checkered-pattern composing means 9, and the low-frequency component Li-1, which is formed of elements arranged in a square pattern, of a 1-step high-frequency band is obtained (step S15). Then, it is determined whether or not the low-frequency component of the highest frequency band, that is, the image data S0, has been obtained (step S16), and if a negative result is obtained in step 16, step 11 is returned to and the processing from step 11 through step 16 is repeated. If a positive result is obtained in step 16, the image data S0 has been reconstructed and the processing is complete.

Next, an embodiment of the image compression apparatus employed in the current embodiment of the image transforming apparatus according to the present invention will be explained.

FIG. 10 is a schematic block diagram of the configuration of the embodiment of an image decompression apparatus according to the current embodiment. As show in FIG. 10, the image compression apparatus 20 according to the current embodiment comprises an image transforming apparatus 1 according to the current embodiment, a quantifying means 21 for quantifying the high-frequency components of all the frequency bands and the low-frequency component of the lowest frequency band obtained by transformation of the image data S0 by the image transforming apparatus 1 and obtaining a quantified signal R0, and an entropy encoding means 22 for subjecting the quantified signal R0 to entropy encoding and obtaining compressed data S1.

By subjecting each element of the high-frequency component Hi and the low-frequency component Ln to division by a predetermined value, etc., the quantifying means 21 is a means that reduces the preciseness of each component; therefore, an optional means for preventing the reduction of the preciseness of the each component to the level of the lowest frequency band can be employed. Note that the quantifying means 21 is only required when performing irreversible data compression, and is not required when reversible data compression is performed.

By dividing the data appearing with a high degree of certainty by few beats, the entropy encoding means 22 reduces the overall volume of the data, and means for performing Hufman encoding, arithmetic encoding, etc. optional encoding may be employed.

Figure 11:
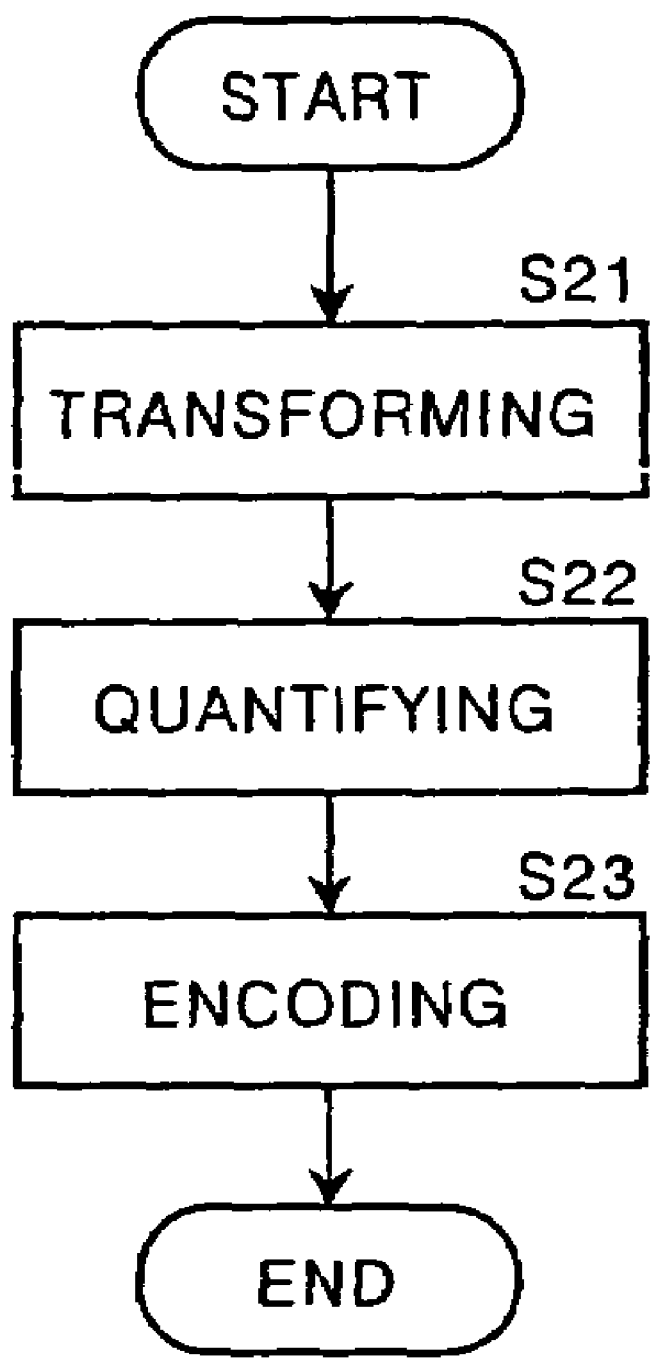
FIG. 11 is a flowchart of the operation of an embodiment of an image compressing apparatus according to the present invention.

Next, the image compression apparatus 20 according to the current embodiment will be explained. FIG. 11 is a flowchart of the operation of the image compression apparatus 20 according to the current embodiment. First, the image data S0 is input to the image transforming means 1, wherein, in the same way as described above the low-frequency component Ln and the high-frequency component Hi are obtained (step S21). The low-frequency component Ln and the high-frequency component Hi are quantified by quantifying means 21 and the quantified signal R0 is obtained (step S22). The quantified signal R0 is encoded by the entropy encoding means and compressed data S1 is obtained (step S23), and the processing is complete.

In this way, the image compression apparatus according to the current embodiment compresses the low-frequency component Ln and the high-frequency component Hi obtained by the image transforming apparatus according to the current embodiment. Here, because the high-frequency component Hi contains many elements having a value of 0 or close to 0, the image data S0 can is compressed at a high compression ratio and compressed data S1 is obtained.

Next, an embodiment of the image decompression apparatus employed in the current embodiment of the image composing apparatus according to the present invention will be explained.

Figure 12:
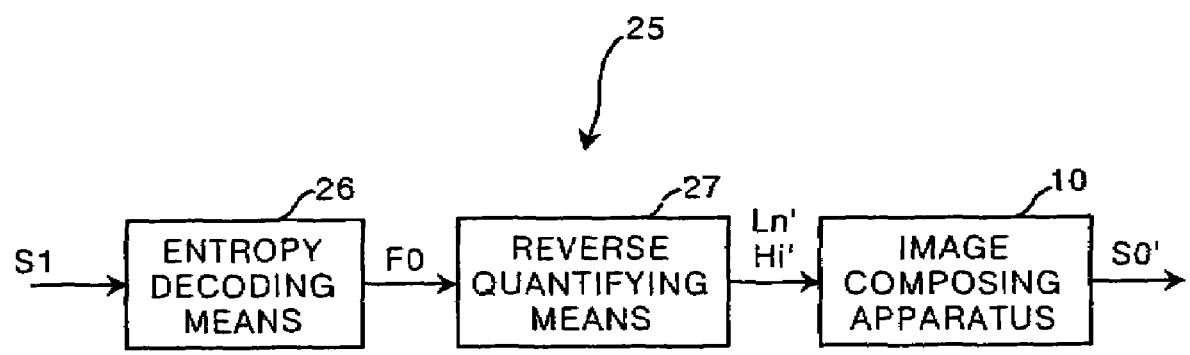
FIG. 12 is a schematic block drawing of an embodiment of an image decompressing apparatus according to the present invention.
Figure 13:
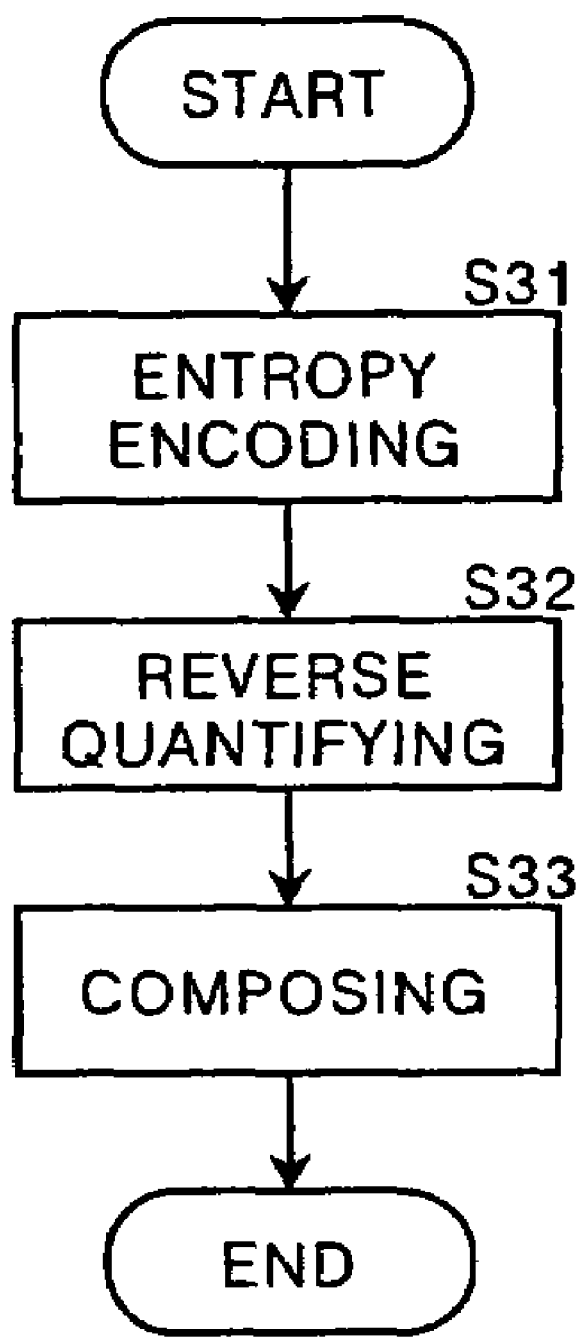
FIG. 13 is a flowchart of the operation of an embodiment of an image decompressing apparatus according to the present invention.

FIG. 12 is a schematic block diagram of the configuration of the embodiment of an image decompression apparatus according to the current embodiment. As show in FIG. 10, the image decompression apparatus 25 according to the current embodiment comprises an entropy decoding means 26 for subjecting the compressed data obtained by the image compression apparatus 20 according to the current embodiment to entropy decoding and obtaining restored data F0, a reverse quantifying means 27 for reverse quantifying the restored data F0 and restoring the high-frequency components Hi' of all the frequency bands and the low-frequency component Ln' of the lowest frequency band, and an image composing means 10 according to the current embodiment. Note that according ton the current embodiment, because the compressed data S1 has been irreversibly compressed, the low-frequency component and the high-frequency component obtained by reverse quantifying means 27 are inferior to the low-frequency component Ln and the high-frequency component Hi. Because of this, a "'" reference mark has been attached to the Ln, Hi and the image data S0.

The entropy decoding means 26 performs the opposite processing of entropy encoding means 22 to restore the compressed data S1 and obtain restored data F0. Note that the restored data F0 is the same as quantified data R0.

The reverse quantifying means 27 performs the opposite processing of quantifying means 21, and obtains the low-frequency component Ln' and the high-frequency component Hi'.

Next, the operation of the image decompression apparatus 25 according to the current embodiment will be explained. FIG. 134 is a flowchart of the operation of the image decompression apparatus 25 according to the current embodiment. First, the compressed data S1 is input to the entropy decoding means 26, is entropy decoded and restored data F0 is obtained (step S31). The restored data F0 is reverse quantified by the reverse quantifying means 27 and the low-frequency component Ln' and the high-frequency component Hi' are obtained (step S32). The low-frequency component Ln'and the high-frequency component Hi' are input to the image composing apparatus 10, wherein they are combined and the image data S0' is obtained, and the processing complete (step S33).

Figure 14:
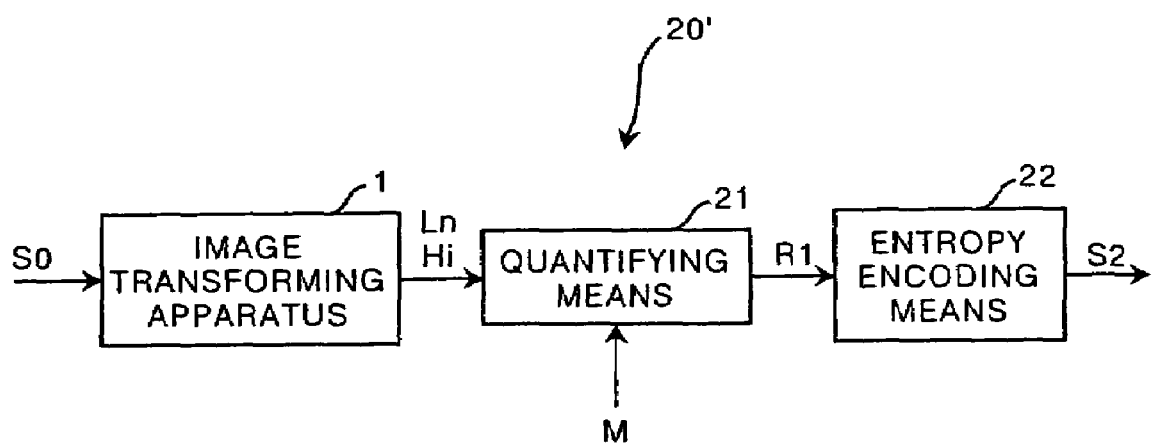
FIG. 14 is a schematic block drawing of another embodiment of an image compressing apparatus according to the present invention.

Note that for cases in which the image data S0 is formed of elements arranged in a checkered pattern, as per the of an image compression apparatus 20' according to another embodiment shown in FIG. 14, the high-frequency components Hi of all the frequency bands and the low-frequency component Li of the lowest frequency band obtained by the transforming the image data S0 by the image transforming apparatus 1 are obtained and quantified and quantified signal R1 is obtained as well of an image data having elements arranged the same way as those in the image data S0 (that is, a checkered pattern element arrangement) and the component composed of all elements having a value of (hereinafter referred to simply as component M), and the quantified signal R1 is entropy encoded and compressed data S2 can be obtained.

Figure 15:
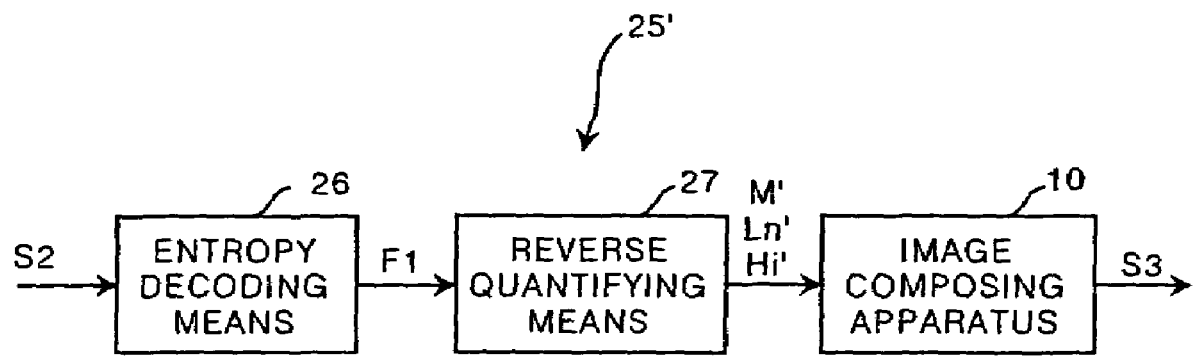
FIG. 15 is a schematic block drawing of another embodiment of an image decompressing apparatus according to the present invention.

The compressed image data obtained in this way is decompressed in an image decompression apparatus 25', as shown in FIG. 15, according to another embodiment of the present invention as follows.

First, the compressed data S2 obtained by the image compression apparatus 20' according to another embodiment described above is entropy decoded and decoded data F1 is obtained. Note that the decoded data F1 is the same as the quantified signal R1. Then, the decoded data F1 is reverse quantified by reverse quantifying means 27 and the low-frequency component Ln', the high-frequency component Hi' and the component M' are obtained.

Note that according to the current embodiment, because the compressed data has been irreversible compressed, the component composed of all elements having a value of 0, the low-frequency component and the high-frequency component obtained by reverse quantifying means 27 are inferior to the low-frequency component Ln, the high-frequency component Hi and the component M. Therefore, a "'" mark is attached to the Ln, Hi and M.

In addition, the component M', the low-frequency component Ln' and the high-frequency component Hi' are input to the image composing apparatus 10 and combined. Here, at first, the low-frequency component Ln' and the high-frequency component Hi' are combined, and the image data S0' (the "'" mark is attached because the image data S0 has been irreversibly compressed) formed of elements arranged in a checkered pattern is obtained. Then, the image data So' formed of elements arranged in a checkered pattern is again combined with the component M' composed of all elements having a value of 0 (this component M' is also formed of elements arranged in a checkered pattern), and finally, reconstructed image data S3 formed of elements arranged in a square pattern is obtained.

Here, on a printer, a monitor or another image output device, the elements forming the image are arranged in a square pattern. Therefore, when the image data S0 formed of elements arranged in a checkered pattern is input to an image output apparatus, the element arrangement must be converted to a square pattern. On the other hand, as in the image compression apparatus according to another embodiment described above, when an image data S0 formed of elements arranged in a checkered pattern is to be compressed, by compressing an image data formed of elements arranged in the same way as in the image data S0, and the element M composed of all elements having a value of 0 together with the low-frequency component Ln and the high-frequency component Hi, if the compressed data S2 is decompressed by the image decompressing apparatus according to the other embodiment described above, the reconstructed image data S3 formed of elements arranged in a square pattern can be obtained. Therefore, the need to convert at an image output apparatus the image data S0 formed of elements arranged in a checkered pattern to image data formed of elements arranged in a square pattern is eliminated. In addition, because it becomes unnecessary to consider at the image output apparatus the arrangement of the elements forming the image data S0 before said image data S0 has been compressed, the need to perform processing corresponding to the element arrangement is eliminated, and therefore, the image output apparatus can be of a simple configuration.

Next, an embodiment of an image processing apparatus employing an image transforming apparatus and an image composing apparatus according to the current embodiment will be explained.

Figure 16:
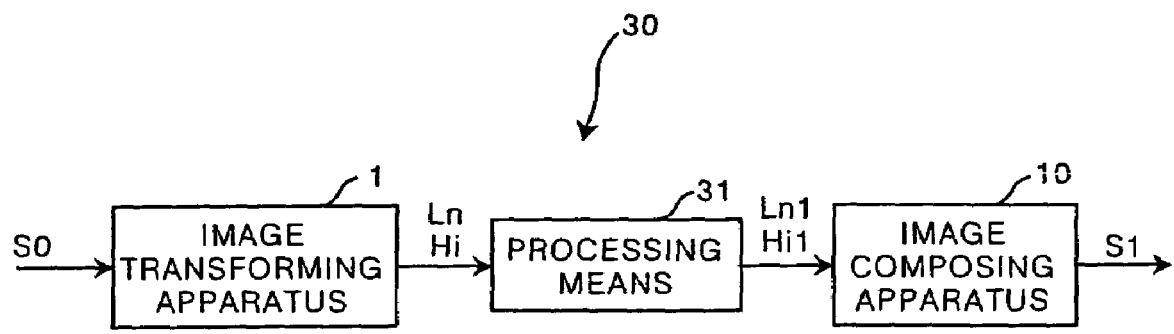
FIG. 16 is a schematic block drawing of an embodiment of an image processing apparatus according to the present invention.

FIG. 16 is a schematic block diagram of the configuration of an image processing apparatus according to the current embodiment. As shown in FIG. 16, the image processing apparatus 30 according to the current embodiment comprises an image transforming apparatus 1 according to the current embodiment, an image processing apparatus 31 for subjecting the low-frequency component of the lowest frequency band and the high-frequency components of a plurality of the frequency bands obtained by transforming the image data S0 by the image transforming apparatus 1 and obtaining a processed low-frequency component Ln1 and a processed high-frequency component Hi1, and an image composing apparatus 10 according to the current embodiment for combining the processed low-frequency component Ln1 and a processed high-frequency component Hi1 and obtaining processed image data S1.

According to the image processing means 31, the high-frequency component Hi of a desired frequency band and/or the low-frequency component Ln of the lowest frequency band from among the low-frequency component of the lowest frequency band and the high-frequency components of all the frequency bands obtained by the image transforming apparatus 1 are subjected to image processing such as blurring-mask processing, step processing, enhancement processing, changing the value of elements processing, and so on, as described, for example, in Japanese Unexamined Patent Publication No. 6(1994)-274614, and obtaining a processed low-frequency component Ln1 and a processed high-frequency component Hi1. Note that although according to the current embodiment, the components of a desired frequency band are subjected to image processing, that called the processed low-frequency component Ln1 and the processed high-frequency component Hi1 include components that have been subjected to image processing and components that have not been subjected to image processing.

Figure 17:
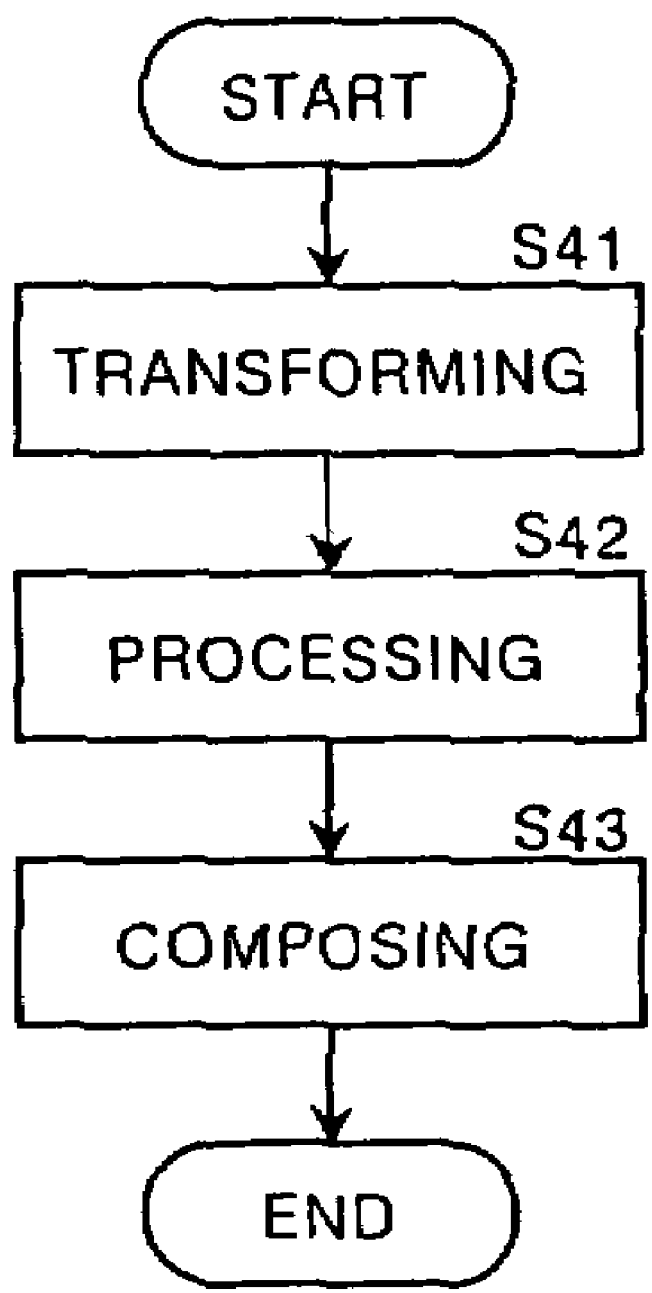
FIG. 17 is a flowchart of the operation of an embodiment of an image processing apparatus according to the present invention.
Figure 18:
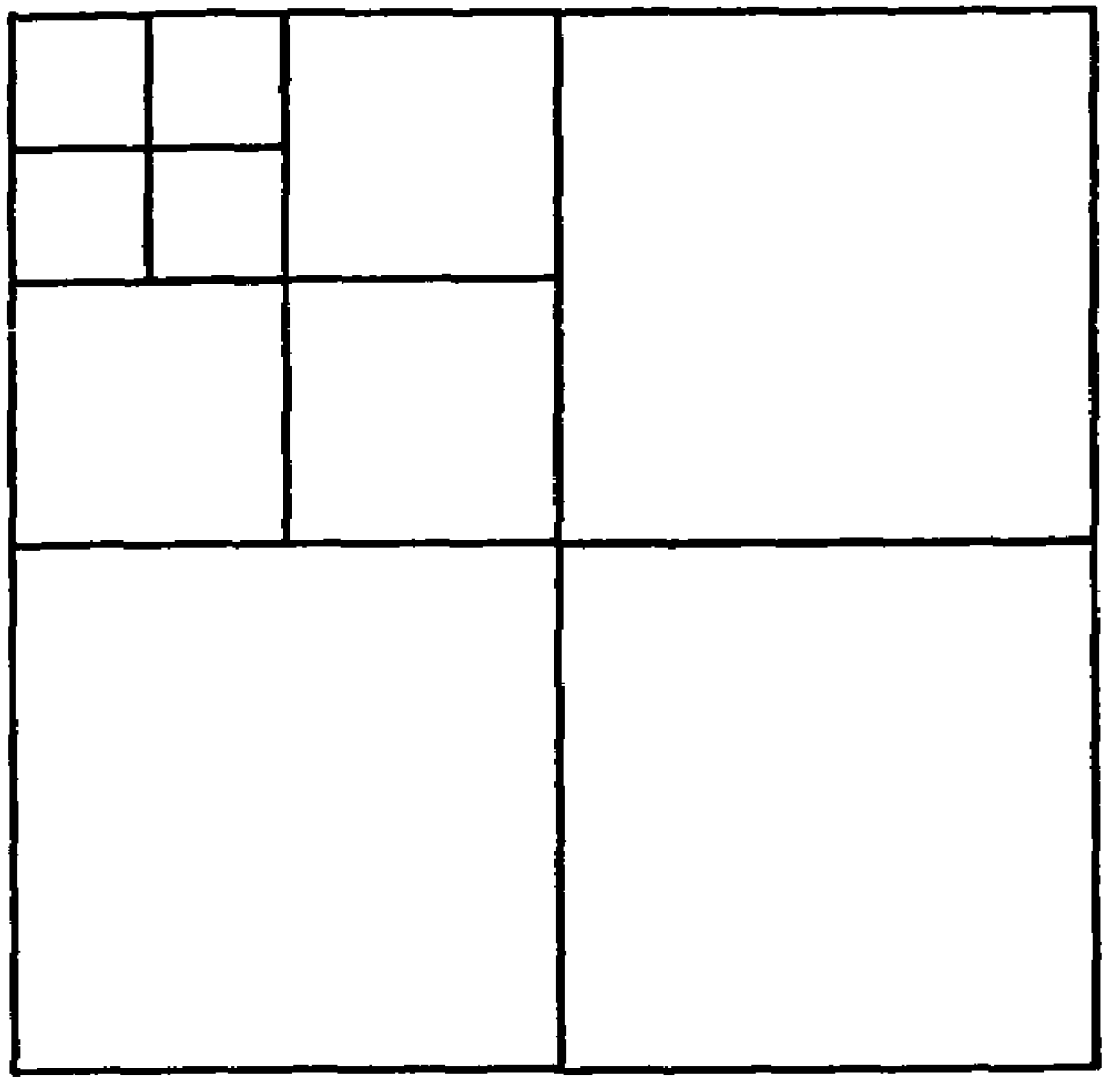
FIG. 18 is provided for explanation of a tensor-multiplied wavelet transform.
Figure 19:
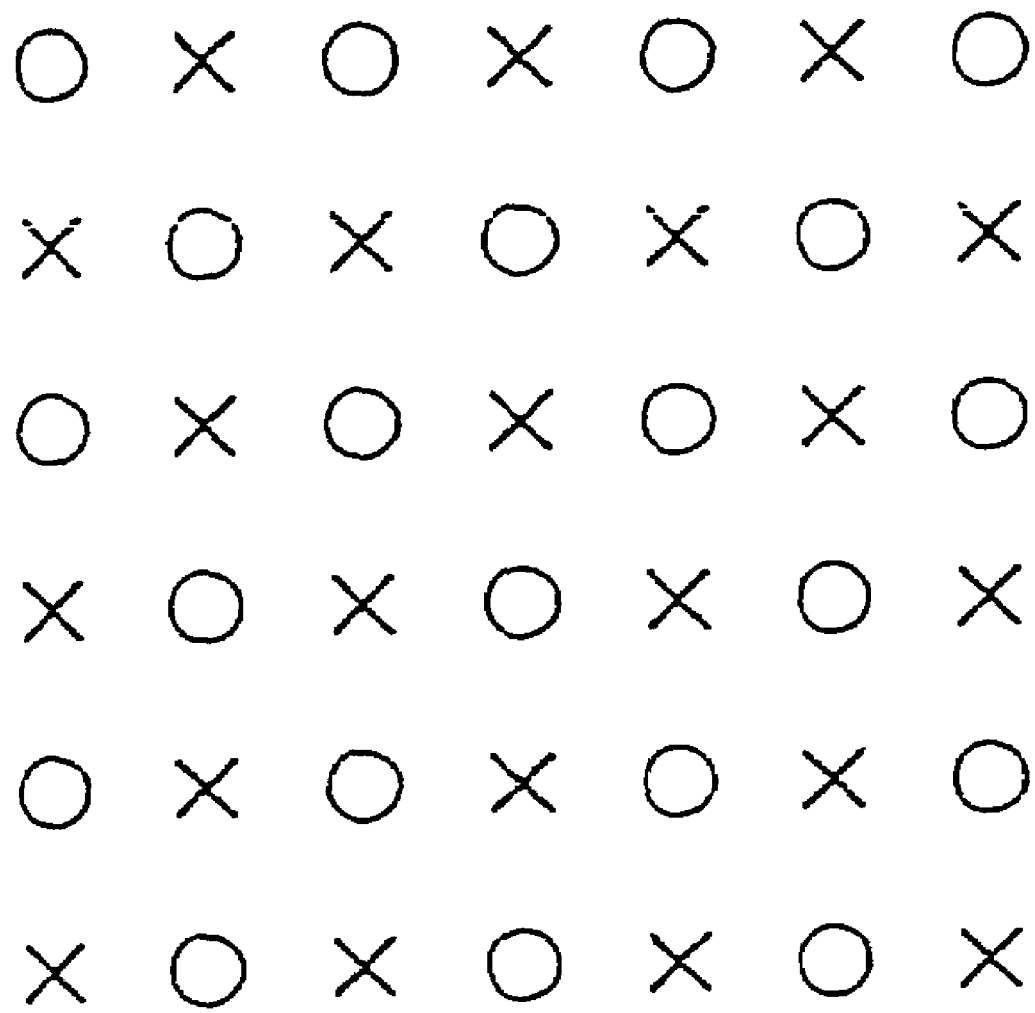
FIG. 19 shows the arrangement of elements.
Figure 20:
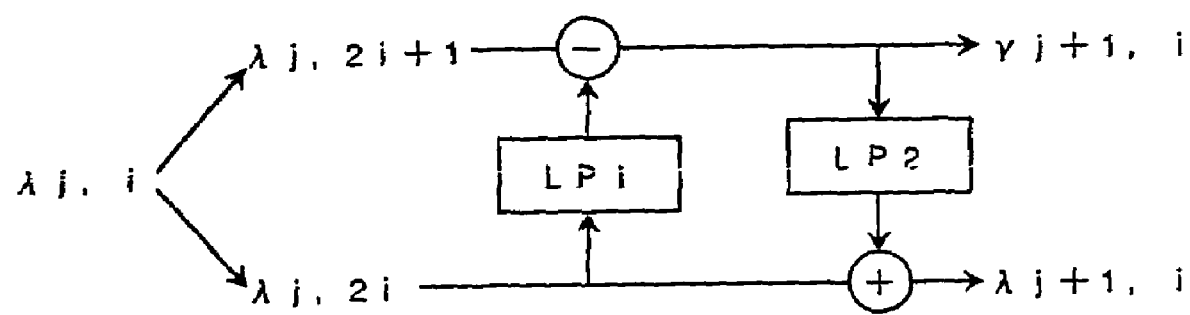
FIG. 20 is provided for explanation of a lifting-dependent wavelet transform.
Figure 21:
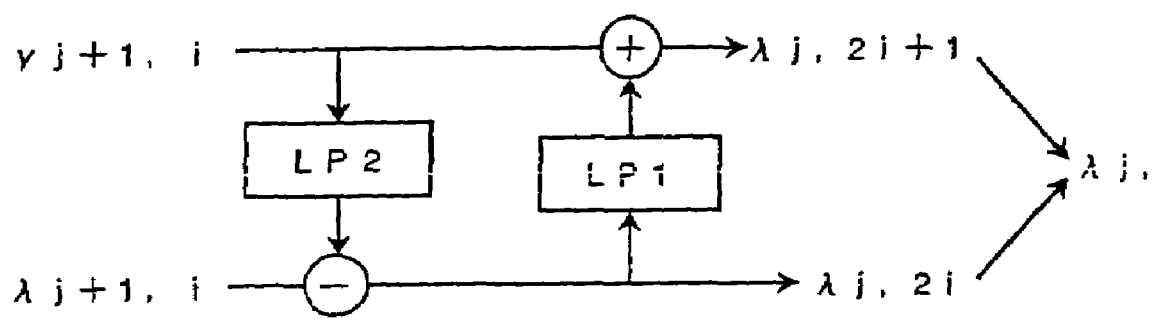
FIG. 21 is provided for explanation of reverse transformation of a lifting-dependent wavelet transform.
Figure 22:
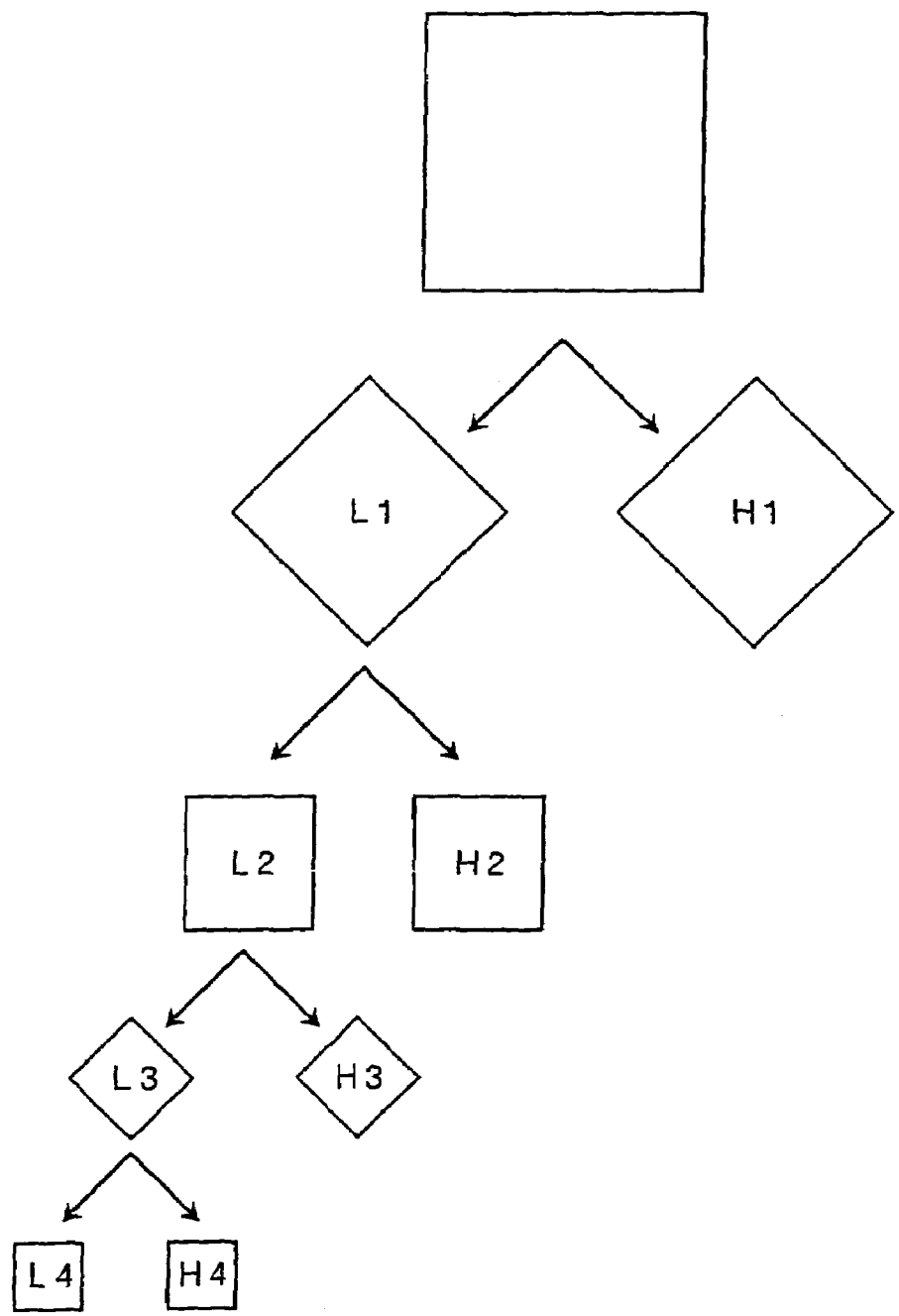
FIG. 22 is shows a multiple-resolution image obtained using an unseparated-type wavelet transform utilizing lifting.

Next, the operation of the image processing apparatus according to the current embodiment will be explained. FIG. 17 is a flowchart of the operation of the image processing apparatus according to the current embodiment. First, the image data SS0 is input to the image transforming apparatus 1 and in the same way as described above a low-frequency component Ln and a high-frequency component Hi are obtained (step S41). The low-frequency component Ln and the high-frequency component Hi are input to the image processing apparatus 31, wherein the components of a desired frequency band are subjected to image processing and processed low-frequency component Ln1 and a processed high-frequency component Hi1 are obtained (step S42). The processed low-frequency component Ln1 and a processed high-frequency component Hi1 are input to the image composing means 10, wherein they are combined and processed image data S1 is obtained (step S43), and the processing is complete.

What is claimed is:

1. A method, which is applied to an image signal, comprising:
    separating the image signal into first and second component signals, each of the first and second component signals comprising a plurality of elements;
    assigning dummy set values to the second component signal elements, wherein the dummy set value assigned to each second component signal element is based on signal values of surrounding first component signal elements;
    obtaining a high frequency component signal using the dummy set values;
    utilizing the high frequency component signal to obtain a compressed version of the image signal; and
    storing the compressed image signal.

2. The method of claim 1, wherein
    the first and second component signals are obtained as a checkered pattern of elements in the image signal, and
    determining the dummy set value of each second component signal element includes:
        choosing a direction in relation to the second component signal element based on an associated change in signal values of the surrounding first component, wherein the change in signal values associated with the chosen direction is smaller than the change in signal values associated with another direction; and
        calculating the dummy set value based on the signal values of the surrounding first component signal elements along the chosen direction.

3. The method of claim 2, wherein
    the second component signal element is surrounded by two first component signal elements (a, d) along a lust direction, and two first component signals (b, c) along a second direction that is perpendicular to the first direction, and
    the dummy set value is calculated according to:

if $|(Sa-Sd)|<|(Sb-Sc)|, Sx=(Sa+Sc)/2$, and if $|(Sa-Sd)|\geq|(Sb-Sc)|, Sx=(Sb+Sc)/2$;

where
    Sx is the dummy set value,
    Sa and Sd are signal values for the first component signal elements a and d, respectively, and
    Sb and Sd are signal values for the first component signal elements b and c, respectively.

4. The method of claim 1, wherein
    the first and second component signals are obtained as a checkered pattern of elements in the image signal, and
    determining the dummy set value of each second component signal element includes:
        determining whether a change in signal values of the first component elements, which surround the second component signal along a particular direction, is below a threshold; and
        if the change in signal values is below the threshold, calculating the dummy set value based on the signal values of the surrounding first component signal elements along the particular direction.

5. The method of claim 4, wherein
    the second component signal element is surrounded by two first component signal elements (a, d) along a first direction, and two first component signals (b, c) along a second direction that is perpendicular to the first direction, and
    the dummy set value is calculated according to at least one of:

if $|(Sa-Sd)|<Th1, Sx=(Sa+Sd)/2$, if $|(Sb-Sc)|<Th2, Sx=(Sb+Sc)/2$, and if $|(Sa-Sd)|\geq Th1$ and $|(Sb-Sc)|\geq Th2, Sx=(Sa+Sb+Sc+Sd)/8$;

where
    Sx is the dummy set value,
    Sn and Sd are signal values for the first component signal elements a and d, respectively, and
    Sb and Sd are signal values for the first component signal elements b and c, respectively, and
    Th1 and Th2 are the corresponding threshold values for the first and second directions, respectively.

6. The method of claim 1, wherein
    the first and second component signals are obtained as a checkered pattern of elements in the image signal, and determining the dummy set value of each second component signal element includes:
    obtaining a vector representing a direction and amount of change in the signal values of first component signal elements surrounding the second component signal; and
    calculating the dummy set value based on the obtained vector if the change in the signal values meets a threshold.

7. The method of claim 6, wherein
the second component signal element is surrounded by two first component signal elements (a, d) along a first direction, and two first component signals (b, c) along a second direction that is perpendicular to the first direction, and
the dummy set value is calculated according to:

if $P<Th, Sx=(Sa+Sb+Sc+Sd)/4$, and if $P \geq Th, Sx=(Sa \cdot \cos\theta + Sb \cdot \sin\theta + Sc \cdot \cos\theta + Sd \cdot \sin\theta)/(2\sin\theta + 2\cos\theta)$;

where
Sx is the dummy set value,
Sa and Sd are signal values for the fast component signal elements a and d, respectively, and
Sb and Sd are signal values for the first component signal elements b and c, respectively,
P and θ are the magnitude and the direction, respectively, of the obtained vector, and
Th is a threshold value for the magnitude of the obtained vector.

8. The method of claim 1, wherein
the high frequency component signal includes an element corresponding to each second component signal element, and
a signal value is obtained for each high frequency component signal element by calculating a difference between a signal value and the assigned dummy set value of the corresponding second component signal element.

9. The method of claim 1, further comprising:
obtaining a low frequency component signal using the first component signal and the high frequency component signal.

10. The method of claim 9, wherein
the low frequency component signal includes an element corresponding to each element of the first component signal, and
a signal value is obtained for each low frequency component signal element by:
    assigning an additive dummy set value to the corresponding first component signal element based on signal values of surrounding high frequency component signal elements; and
    calculating a sum of a signal value and the assigned additive dummy set value of the corresponding first component signal element.

11. The method of claim 10, wherein
the corresponding first component signal element is surrounded by four second component signal elements (e, f, g, h), and
the additive dummy set value, which is assigned to the corresponding first component signal, is calculated according to:

$Sy=(Se+Sf+Sg+Sh)/8$;

where
Sy is the additive dummy set value, and
Se, Sf Sg, and Sh are signal values of the high frequency component signal elements correspond jug to the second component signal elements e, f, g, and h, respectively.

12. The method of claim 9, the method being iteratively performed by:
rotating the low frequency component signal obtained during a previous iteration at substantially 45 degrees;
using the rotated low frequency component signal as the image signal of the subsequent iteration; and
performing iterations until a low frequency component signal of a desired frequency band is obtained.

13. The method of claim 12, further comprises:
subjecting the low frequency component signal of the desired frequency band, and the high frequency component signals obtained during the iterations, to image compression processing in order to generate the compressed image signal.

14. A method of iteratively composing an image from the compressed image signal obtained and stored from the method of claim 12, the compressed image signal including the obtained high frequency component signals and the low frequency component signal of the desired frequency band, the method comprising:
performing N iterations, wherein the $n^{th}$ iteration (n being 1...N) comprises:
    assigning an additive dummy set value to each element in an $n^{th}$ low frequency component signal based on surrounding elements of an $n^{th}$ high frequency component signal;
    calculating, for each of the $n^{th}$ low frequency component signal elements, a difference between a corresponding signal value and the assigned additive dummy set value, thereby obtaining an $n^{th}$ first component signal;
    assigning dummy set values to each element of the $n^{th}$ high frequency component signal based on surrounding elements in the $n^{th}$ first component signal; and
    calculating, for each of the $n^{th}$ high frequency component signal elements, a sum of a corresponding signal value and the assigned dummy set value, thereby obtaining an $n^{th}$ second component signal; and
    arranging the $n^{th}$ first and second component signals to obtain an $(n+1)^{th}$ low frequency component signal,
    wherein the low frequency component signal of the desired frequency band is set as the $1^{st}$ low frequency component signal.

15. An apparatus for iteratively composing an image from the compressed image signal obtained and stored from the method of claim 12, the compressed image signal including the obtained high frequency component signals and the low frequency component signal of the desired frequency band, the apparatus being configured to:
perform N iterations, wherein the $n^{th}$ iteration (n being 1...N) comprises:
    assigning an additive dummy set value to each element in an $n^{th}$ low frequency component signal based on surrounding elements of an $n^{th}$ high frequency component signal;
    calculating, for each of the $n^{th}$ low frequency component signal elements, a difference between a corresponding signal value and the assigned additive dummy set value, thereby obtaining an $n^{th}$ first component signal;

assigning dummy set values to each element of the $n^{th}$ high frequency component signal based on surrounding elements in the $n^{th}$ first component signal; and calculating, for each of the $n^{th}$ high frequency component signal elements, a sum of a corresponding signal value and the assigned dummy set value, thereby obtaining an $n^{th}$ second component signal; and arranging the $n^{th}$ first and second component signals to obtain an $(n+1)^{th}$ low frequency component signal, wherein the low frequency component signal of the desired frequency band is set as the $1^{st}$ low frequency component signal.

16. An apparatus for transforming an image signal, configured to:

separate the image signal into first and second component signals, each of the first and second component signals comprising a plurality of elements;

assign dummy set values to the second component signal elements, wherein the dummy set value assigned each second component signal element is based on signal values of surrounding first component signal elements;

obtain a high frequency component signal using the dummy set values;

utilize the high frequency component signal to obtain a compressed version of the image signal; and store the compressed image signal.

17. The apparatus of claim 15, wherein the apparatus obtains the first and second component signals as a checkered pattern of elements in the image signal, and the apparatus is configured to calculate the dummy set value of each second component signal element by:

choosing a direction in relation to the second component signal element based on an associated change in signal values of the surrounding first component elements, wherein the change in signal values associated with the chosen direction is smaller than the change in signal values associated with another direction; and calculating the dummy set value based on the signal values of the surrounding first component signal elements along the chosen direction.

18. The apparatus of claim 17, wherein the second component signal element is surrounded by two first component signal elements (a, d) along a fist direction, and two first component signals (b, c) along a second direction that is perpendicular to the first direction, and the apparatus calculates the dummy set value according to:

if $|(Sa-Sd)|<|(Sb-Sc)|, Sx=(Sa+Sc)/2$, and if $|(Sa-Sd)|\geq|(Sb-Sc)|, Sx=(Sb+Sc)/2$;

where

Sx is the dummy set value,

Sa and Sd are signal values for the first component signal elements a and d, respectively, and Sb and Sd are signal values for the first component signal elements b and c, respectively.

19. The apparatus of claim 16, wherein the apparatus obtains the first and second component signals as a checkered pattern of elements in the image signal, and the apparatus is configured to calculate the dummy set value of each second component signal element by:

determining whether a change in signal values of the first component elements, which surround the second component signal along a particular direction, is below a threshold; and if the change in signal values is below the threshold, calculating the dummy set value based on the signal values of the surrounding first component signal elements along the particular direction.

20. The apparatus of claim 19, wherein the second component signal element is surrounded by two first component signal elements (a, d) along a first direction, and two first component signals (b, c) along a second direction that is perpendicular to the first direction, and the apparatus calculates the dummy set value according to at least one of:

if $|(Sa-Sd)|<Th1, Sx=(Sa+Sd)/2$, if $|(Sb-Sc)|<Th2, Sx=(Sb+Sc)/2$, and if $|(Sa-Sd)|\geq Th1$ and $|(Sb+Sc)|\geq Th2, Sx=(Sa+Sb+Sc+Sd)/8$;

where

Sx is the dummy set value,

Sa and Sd are signal values for the first component signal elements a and d, respectively, and Sb and Sd are signal values for the first component signal elements b and c, respectively, and Th1 and Th2 are the corresponding threshold values for the first and second directions, respectively.

21. The apparatus of claim 16, wherein the apparatus obtains the first and second component signals as a checkered pattern of elements in the image signal, and the apparatus is configured to calculate the dummy set value of each second component signal element includes:

obtaining a vector representing a direction and amount of change in the signal values of first component signal elements surrounding the second component signal; and calculating the dummy set value based on the obtained vector if the change in signal values meets a threshold.

22. The apparatus of claim 21, wherein the second component signal element is surrounded by two first component signal elements (a, d) along a first direction, and two first component signals (b, c) along a second direction that is perpendicular to the first direction, and the apparatus calculates the dummy set value according to:

if $P<Th, Sx=(Sa+Sb+Sc+Sd)/4$, and if $P\geq Th, Sx=(Sa\cdot\cos\theta+Sb\sin\theta Sc\cdot\cos\theta+Sd\sin\theta)/(2\sin\theta+2\cos\theta)$;

where

Sx is the dummy set value,

Sa and Sd are signal values for the first component signal elements a and d, respectively, and Sb and Sd are signal values for the first component signal elements b and c, respectively, P and $\theta$ are the magnitude and the direction, respectively, of the obtained vector, and Th is a threshold value for the magnitude of the obtained vector.

23. The apparatus of claim 16, wherein:

the high frequency component signal includes an element corresponding to each second component signal element, and the apparatus is configured to obtain a signal value for each high frequency component signal element by calculating a difference between a signal value and the assigned dummy set value of the corresponding second component signal element.

24. The apparatus of claim 23, wherein the apparatus is configured to obtain a low frequency component signal, which includes an element corresponding to each element of the first component signal, by:

assigning an additive dummy set value to the corresponding first component signal element based on signal values of surrounding high frequency component signal elements; and calculating a sum of a signal value and the assigned additive dummy set value of the corresponding first component signal element.

25. The apparatus of claim 24, wherein the corresponding first component signal element is surrounded by four second component signal elements (e, f, g, h), and the apparatus calculates the additive dummy set value, which is assigned to the corresponding first component signal, according to:

$$Sy=(Se+Sf+Sg+Sh)/8;$$

where

Sy is the additive dummy set value, and

Se, Sf, Sg, and Sh are signal values of the high frequency component signal elements corresponding to the second component signal elements e, f, g, and h, respectively.

26. The apparatus of claim 16, wherein the apparatus is configured to perform iterative processing by:

rotating the low frequency component signal obtained during a previous iteration at substantially 45 degrees;

using the rotated low frequency component signal as the image signal of the subsequent iteration; and performing iterations until a low frequency component signal of a desired frequency band is obtained.

27. The apparatus of claim 16, wherein the apparatus is configured to subject the low frequency component signal of the desired frequency band, and the high frequency component signals obtained during the iterations to image compression processing in order to generate the compressed image singal.

* * * * *